United States Patent
Kawai

(10) Patent No.: US 8,446,517 B2
(45) Date of Patent: May 21, 2013

(54) IMAGING APPARATUS AND METHOD

(75) Inventor: Takashi Kawai, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/389,148

(22) PCT Filed: Aug. 5, 2010

(86) PCT No.: PCT/JP2010/063247
§ 371 (c)(1),
(2), (4) Date: Feb. 6, 2012

(87) PCT Pub. No.: WO2011/018975
PCT Pub. Date: Feb. 17, 2011

(65) Prior Publication Data
US 2012/0133822 A1 May 31, 2012

(30) Foreign Application Priority Data
Aug. 13, 2009 (JP) .................. 2009-187802

(51) Int. Cl.
*H04N 5/232* (2006.01)
*H04N 5/262* (2006.01)

(52) U.S. Cl.
USPC .................... 348/347; 348/240.99

(58) Field of Classification Search
USPC .............. 348/345, 347, 348, 349, 353–356, 348/240.99, 240.3; 396/103, 77, 87
See application file for complete search history.

(56) References Cited

U.S. PATENT DOCUMENTS 6,967,686 B1 * 11/2005 Tanaka .......................... 348/352
7,702,231 B2 * 4/2010 Sugimoto .................... 396/123
7,860,386 B2 * 12/2010 Terashima .................... 396/104
8,068,164 B2 11/2011 Kumagai et al.
8,284,275 B2 * 10/2012 Abe ......................... 348/240.99
2009/0116830 A1 5/2009 Kumagai

FOREIGN PATENT DOCUMENTS

| JP | 1 284184 | 11/1989 |
| JP | 2009 115981 | 5/2009 |
| JP | 2010 26405 | 2/2010 |

OTHER PUBLICATIONS

International Search Report Issued Sep. 14, 2010 in PCT/JP10/63247, filed Aug. 5, 2010.

* cited by examiner

*Primary Examiner* — Chieh M Fan
*Assistant Examiner* — Ahmed A Berhan
(74) *Attorney, Agent, or Firm* — Oblon, Spivak, McClelland, Maier & Neustadt, L.L.P.

(57) ABSTRACT

The present invention relates to an imaging apparatus and method capable of improving operability regarding a zooming operation and suppressing the photographing of an unstably focused image. A zoom information acquisition section 201 acquires the information specifying both a zoom direction of zoom-in or zoom-out and a zoom speed. A subject information acquisition section 202 acquires the information, which specifies the coordinate position of the upper left corner of an AF tracking frame and the area of the AF tracking frame, regarding a detected subject. A threshold value setting section 203 sets the value of a predetermined zoom speed as a threshold value for determining whether or not to release a subject tracking AF function. A switching determination section 204 determines whether or not to release the subject tracking AF function on the basis of the zoom speed acquired by the zoom information acquisition section 201 and the threshold value set by the threshold value setting section 203.

5 Claims, 17 Drawing Sheets

IMAGING APPARATUS AND METHOD

TECHNICAL FIELD

The present invention relates to an imaging apparatus and method and in particular, to an imaging apparatus and method capable of improving operability regarding a zooming operation and suppressing the photographing of an unstably focused image.

BACKGROUND ART

In recent years, products having a face detection function of detecting the face of a person as one of the subject detection functions are increasing in digital cameras. Moreover, for example, products have also been developed which focus on a subject designated by a photographer by detecting the subject using feature point extraction, color extraction, or the like so that the focus follows the subject even if the subject moves within a screen, and these products are commercially available. That is, it is possible to make the focus follow the subject automatically through the subject detection function and the AF (Auto Focus) function.

There are many digital cameras with a face detection function, and various techniques for detection of an image of the face of a person have been developed. For example, a technique of determining the focus position at high speed on the basis of the size of the face has also been proposed by applying the technique of extracting a person from the image data to cameras (for example, refer to PTL 1).

In a digital camera with such a face detection function, the AF function works such that when a person as a subject moves within the screen, the focus follows the face of the person, for example. Moreover, in the digital camera, the AF function works such that the focus follows the face of a person even if a zooming operation is performed.

CITATION LIST

Patent Literature
[PTL 1] JP-A-2004-317699

SUMMARY OF INVENTION

Technical Problem

However, when performing AF while tracking a subject, a subject to be photographed is not necessarily located in the middle. For example, when a zooming operation is performed, the position or size of the subject within the screen changes. In addition, from the relationship of accuracy or time lag of position detection of a subject, the subject may leave the screen or may be unsteady due to a change in the position or size of the subject within the screen, which is caused by a change in the angle of view during the zooming operation.

In addition, when a user who is a photographer performs a zooming operation in a normal digital camera, it is possible to designate a zoom direction of zoom-in or zoom-out and a zoom speed which determines how much to change the magnification in a unit of time. For example, when a user who is a photographer performs a zooming operation at low zoom speed, the change in the angle of view caused by the zooming operation becomes gentle. Accordingly, the influence of time lag on the position detection of a subject is reduced.

However, when performing a zooming operation at high zoom speed, the change in the angle of view caused by the zooming operation is significantly increased. Accordingly, the influence of time lag on the position detection of a subject cannot be neglected. In addition, since it is not possible to perform a fine zooming operation, a subject to be photographed leaves the screen in many cases.

Thus, during the zooming operation, it is not possible to make the focus follow a subject, which is to be photographed, correctly. For this reason, focusing on the subject is not realized during the zooming operation in many cases, and the subject is incorrectly detected and the focus follows a portion, for example. As a result, an image is photographed in a blurred state in many cases. The image photographed in such a state is very difficult to see.

In addition, it is thought that when performing a zooming operation, the user who is a photographer pays attention to the background or other subjects, in many cases, rather than a person of a subject whose face has been detected. In such a case, since the AF function works so that the focus follows the face of the person even during the zooming operation, the user may feel that the operability is rather low.

The present invention has been made in view of such a situation, and an object of the present invention is to improve the operability regarding a zooming operation and to suppress the photographing of an unstably focused image.

Solution to Problem

According to an aspect of the present invention, an imaging apparatus includes: subject detection means for detecting a subject in an image captured by an imaging unit; subject tracking AF mode execution means for setting a control mode of a lens driving control unit to a subject tracking AF mode, in which the focus follows the detected subject, when the subject is detected in the image; and control means for setting the control mode of the lens driving control unit to a normal AF mode, in which focusing on the middle of the image is performed, on the basis of zooming operation information of a zooming operation through an operating unit in the subject tracking AF mode.

Threshold value setting means for setting a threshold value regarding the zoom speed of the zooming operation may be further provided. The control means may set the control mode of the lens driving control unit to the normal AF mode on the basis of the zoom speed included in the zooming operation information and the threshold value regarding the zoom speed.

The threshold value setting means may set the threshold value according to a zoom direction included in the zooming operation information.

The threshold value setting means may set the threshold value according to a position of the subject included in information regarding the subject.

The threshold value setting means may set the threshold value according to a position of the subject and a size of the subject included in information regarding the subject.

The threshold value setting means may set the threshold value according to a zoom direction included in the zooming operation information and a position of the subject included in information regarding the subject.

Subject designation determination means for determining whether or not a subject to be detected by the subject detection means has been designated on the basis of a user's command input through the operating unit is further provided. The threshold value setting means may set the threshold value according to whether or not a subject to be detected by the subject detection means has been designated.

According to another aspect of the present invention, an imaging method includes: a step of, when a subject in an image is detected by subject detection means for detecting a subject in an image captured by an imaging unit, setting a control mode of a lens driving control unit to a subject tracking AF mode in which the focus follows the detected subject by means of subject tracking AF mode execution means; and a step of setting the control mode of the lens driving control unit to a normal AF mode, in which focusing on the middle of the image is performed, on the basis of zooming operation information of a zooming operation through an operating unit in the subject tracking AF mode by means of control means.

According to the aspect of the present invention, when a subject in an image is detected by subject detection means for detecting a subject in an image captured by an imaging unit, a control mode of a lens driving control unit is set to a subject tracking AF mode in which the focus follows the detected subject. In the subject tracking AF mode, the control mode of the lens driving control unit is set to a normal AF mode, in which focusing on the middle of the image is performed, on the basis of zooming operation information of a zooming operation through an operating unit.

ADVANTAGEOUS EFFECTS OF INVENTION

According to the present invention, it is possible to improve operability regarding a zooming operation and to suppress the photographing of an unstably focused image.

DESCRIPTION OF EMBODIMENTS

Hereinafter, embodiments of the present invention will be described with reference to the accompanying drawings.

Figure 1:
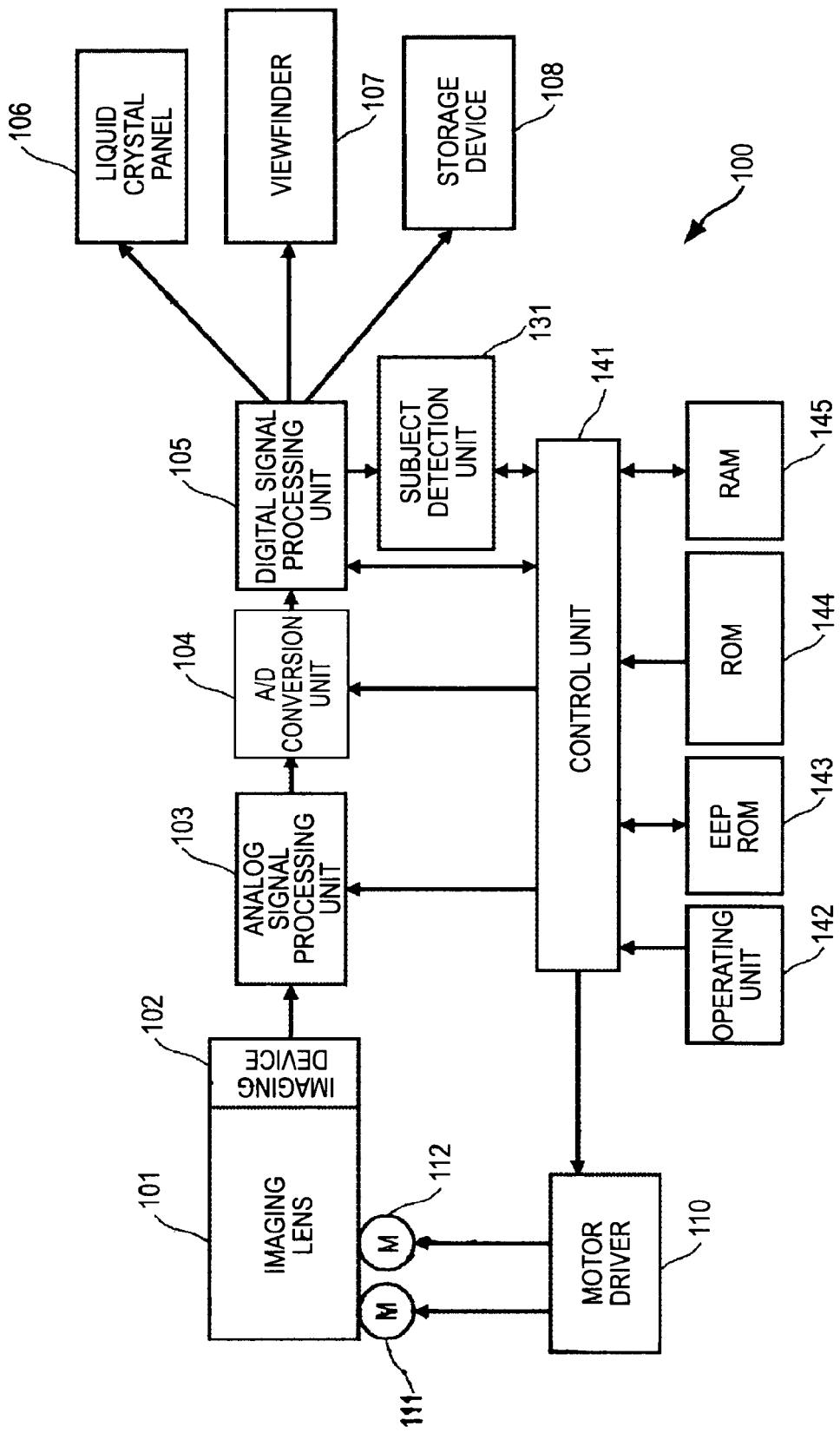
FIG. 1 is a block diagram showing the exemplary configuration of a digital camera related to an embodiment of the present invention.

FIG. 1 is a block diagram showing the exemplary configuration of a digital camera 100 related to an embodiment of the present invention. The digital camera 100 is configured as a digital camcorder, for example.

An imaging lens 101 is configured to include a zoom lens for changing the focal length continuously and the focus lens for focusing on a subject. In addition, an iris which changes the diameter of a diaphragm, an ND mechanism which inserts an ND (Neutral Density) filter, a shift vibration control type blurring correction lens which corrects the vibration of the hand at the time of imaging, and the like may also be included in the imaging lens 101 when necessary.

Light transmitted through the imaging lens 101 is converted into an electric signal after being imaged by an imaging device 102. The imaging device 102 is formed by a photoelectric conversion sensor, such as a CCD sensor or a CMOS sensor, for example.

The electric signal output from the imaging device 102 is input to an analog signal processing unit 103, and processing such as noise removal is performed on the electric signal.

Then, an analog signal output from the analog signal processing unit 103 is converted into digital data by an A/D conversion unit 104.

The digital data output from the A/D conversion unit 104 is output after processing such as gamma correction is performed by a digital signal processing unit 105, and an image corresponding to the digital data is displayed on a liquid crystal panel 106 and a viewfinder (EVF) 107. In addition, an image displayed on the liquid crystal panel 106 and the viewfinder 107 may also be displayed in a state overlapping a GUI used for the operation of an operating unit 142, will be described later.

In addition, the digital data output from the A/D conversion unit 104 is recorded on a storage device 108 formed by a flash memory, a DV tape, or the like.

The operating unit 142 is configured to include a photographing start (REC) button, a zooming operation interface, a touch panel, and the like. In addition, the operating unit 142 receives an operation based on the GUI displayed on the liquid crystal panel 106 and the viewfinder 107, for example. An operation signal corresponding to the command, which is input through the operating unit 142 by the user, is output to a control unit 141.

In addition, when performing a zooming operation through the operating unit 142, it is possible to designate a zoom direction of zoom-in or zoom-out and a zoom speed which determines how much to change the magnification in a unit of time.

An EEPROM 143 is a nonvolatile memory and stores image data, various kinds of supplementary information, setup information, and the like.

A subject detection unit 131 detects the subject in the image data by analyzing the image data, which is output through the processing of the analog signal processing unit 103 to the digital signal processing unit 105, on the basis of the light input through the imaging lens 101. For example, the subject detection unit 131 detects an image of the face of a person in the image data. Detection of the face image is performed on the basis of the feature quantity of the image, model data stored in advance, and the like, for example.

In addition, the subject detection unit 131 may detect a subject using a different method when necessary. For example, it is also possible to detect an object, which is located at the predetermined coordinate position in an image (screen), as a subject.

In addition, the subject detection unit 131 may detect a subject using a different method when necessary. For example, in the image (screen), a predetermined object designated by the user operation input through the operating unit 142 may be detected as a subject.

That is, the subject detection unit 131 can detect automatically an image of the face of a person or the like as a subject by analyzing an image and can also detect automatically an object or the like, which corresponds to an image designated by the user, as a subject. In addition, the subject detection unit 131 can also detect an object located at the predetermined coordinate position in an image as a subject.

The control unit 141 is configured to include a processor inside, and controls the execution of various kinds of processing executed in the digital camera 100. For example, the control unit 141 generates a control signal required for various kinds of processing by loading software, such as a program recorded on a ROM 144, to a RAM 145 and executing it and outputs the control signal to each section.

In addition, the control unit 141 executes processing for realizing an AF function of focusing on the subject detected by the subject detection unit 131, an AE function of adjusting the brightness, a WB function of performing white balance, and the like. A control signal generated by the processing for realizing the AF function is supplied to a motor driver 110.

In addition, the control unit 141 generates a control signal corresponding to the user's zooming operation input through the operating unit 142 and outputs the control signal to the motor driver 110.

The motor driver 110 converts the control signal supplied from the control unit 141 into a voltage and supplies each voltage to the focus lens driving motor 111 for driving the focus lens and a zoom lens driving motor 112 for driving a zoom lens. Then, the focus lens driving motor 111 and the zoom lens driving motor 112 operate to drive the focus lens and the zoom lens of the imaging lens 101.

In the digital camera 100 of the present invention, the AF function works such that when a person as a subject moves within the screen, the focus follows the face of the person, for example. Moreover, in the digital camera 100, the AF function works such that the focus follows the face of a person even if a zooming operation is performed. That is, the AF function of the control unit 141 is to make the focus follow the face of a person by supplying a control signal to the motor driver 110 so as to focus on the subject detected by the subject detection unit 131.

Figure 2:
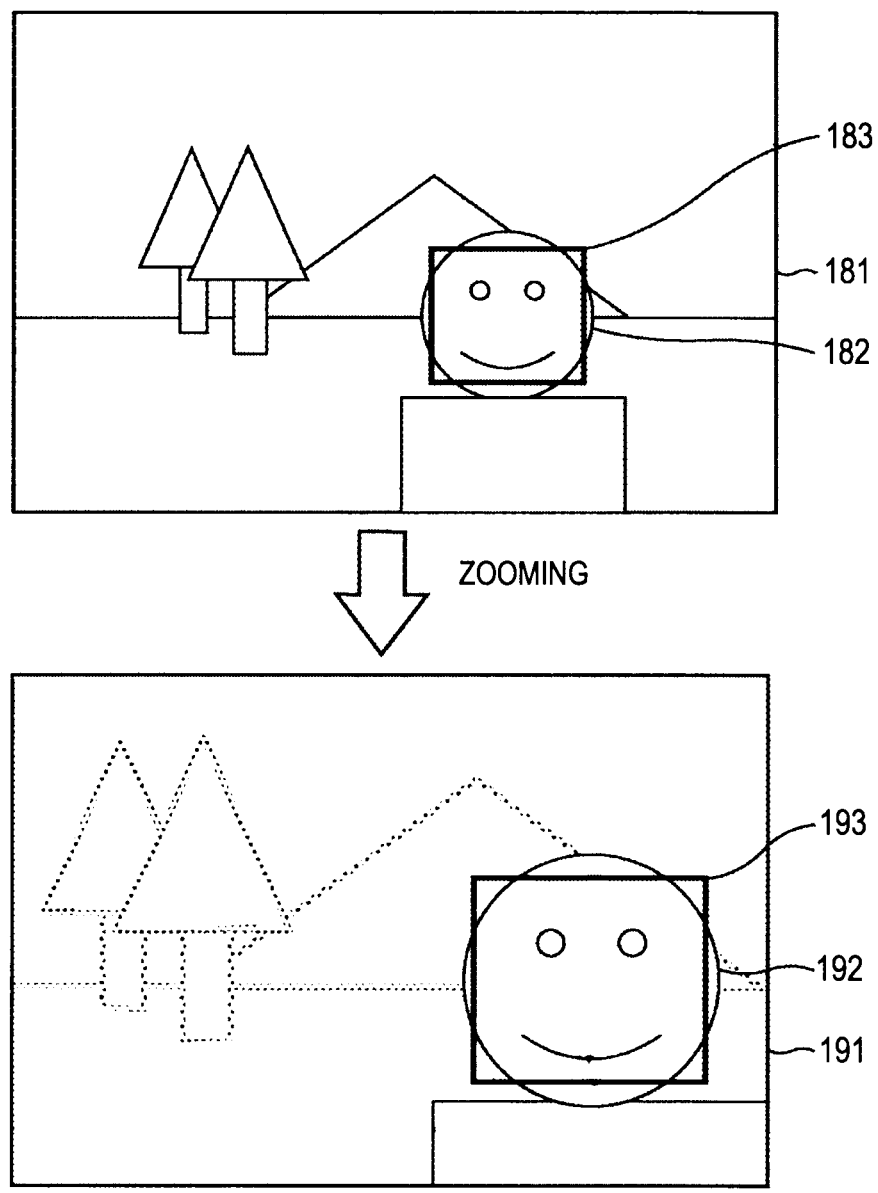
FIG. 2 is a view explaining an AF function of making the focus follow the face of a person when a zooming operation is performed.

FIG. 2 is a view explaining the AF function of making the focus follow the face of a person when a zooming operation is performed in the digital camera 100.

In this drawing, each of images 181 and 191 is an image photographed by the digital camera 100. In the images 181 and 191, a person as a main subject and a mountain and trees as the background are photographed.

In addition, the image 191 is an image photographed as a result when a user performs a zooming operation in a state where the image 181 is photographed. That is, the image 191 is photographed when the user of the digital camera 100 performs a zoom-in operation of increasing the magnification of an image by operating the operating unit 142 in a state where the image 181 is photographed. Accordingly, in the image 191, an image of the person is displayed as larger compared with the image 181, and an image of the mountain and trees as the background is displayed unclearly compared with the image 181.

In addition, in the images 181 and 191, faces 182 and 192 of a person as a subject detected by the subject detection unit 131 are photographed. In addition, zoom magnifications of the faces 182 and 192 are different, and the faces 182 and 192 are the face of the same person.

AF tracking frames 183 and 193, which are rectangular frames for displaying the subject detected by the subject detection unit 131, are displayed on the images 181 and 191, respectively. Thus, through the AF function of the digital camera 100, the focus lens driving motor 111 and the zoom lens driving motor 112 operate so as to focus on the image of the AF tracking frame. In the digital camera 100, an image on which the face of a person is clearly displayed can be photographed, by such an AF function, even if a person in the image moves or a zooming operation is performed.

Thus, the AF function of controlling the operations of the focus lens driving motor 111 and the zoom lens driving motor 112 so that the AF tracking frame follows a subject to realize focusing on the subject is called a subject tracking AF function.

However, when performing a zooming operation at high zoom speed, a change in the angle of view caused by the zooming operation is significantly increased. As a result, it may take time for the subject detection unit 131 to detect a subject (for example, the face of a person). In addition, the face of a person to be photographed may leave the screen due to the change in the angle of view according to the zooming operation.

Thus, when a zooming operation is performed at high zoom speed, the focus may not follow the subject to be photographed correctly. For this reason, focusing on the subject is not realized during the zooming operation in many cases, and the subject is incorrectly detected and the focus follows a portion, for example. As a result, an image is photographed in a blurred state in many cases. The image photographed in such a state is very difficult to see.

In addition, it is thought that when performing a zooming operation, the user who is a photographer pays attention to the background or other subjects, in many cases, rather than a person of a subject whose face has been detected. In such a case, since the AF function works so that the focus follows the face of a person even during the zooming operation, the user may feel that the operability is rather low.

Therefore, in the digital camera 100 of the present invention, the subject tracking AF function may be released in a predetermined situation during the zooming operation.

Moreover, in the digital camera 100, there is a normal AF function as a different AF function from the subject tracking AF function. In the normal AF function, the operations of the focus lens driving motor 111 and the zoom lens driving motor 112 are controlled so as to focus on an object located in the middle of the photographed image, for example.

In the digital camera 100, when the subject tracking AF function is released in a predetermined situation during the zooming operation, an image is photographed by the normal AF function.

Figure 3:
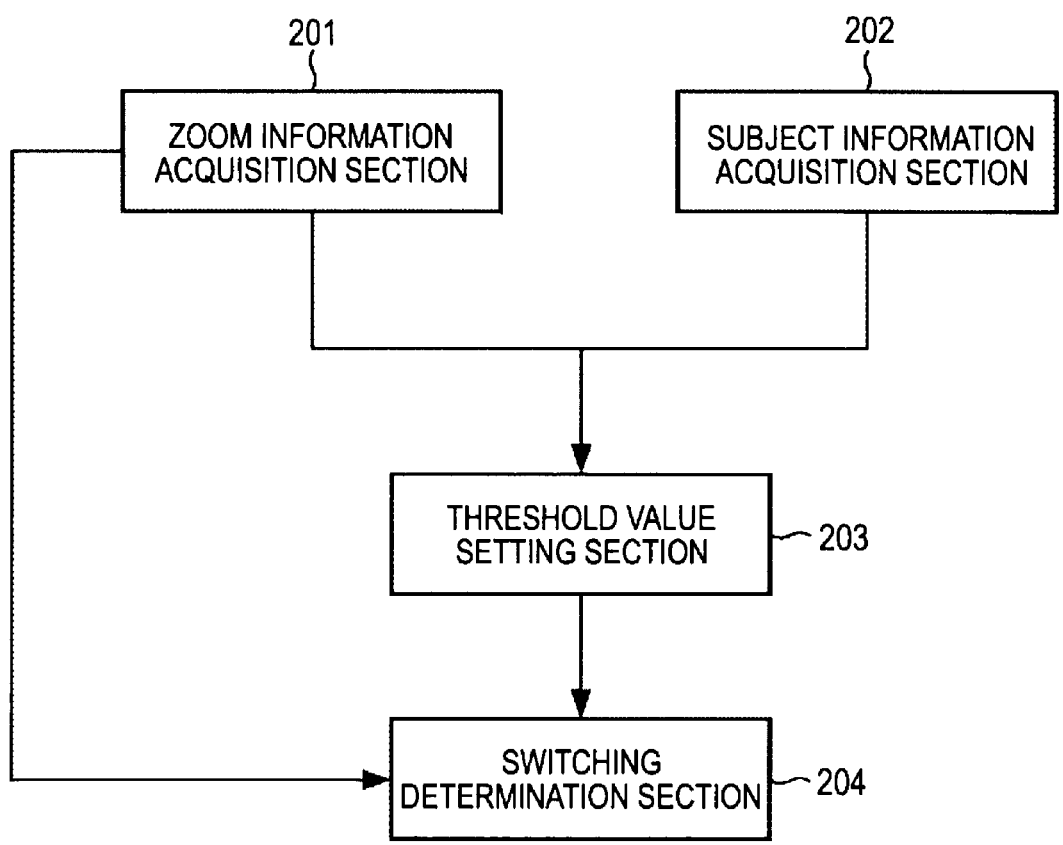
FIG. 3 is a block diagram showing an example of the functional configuration of software executed by a control unit in FIG. 1.

FIG. 3 is a block diagram showing an example of the functional configuration of software which is software executed by the control unit 141 and which controls processing regarding the release of the subject tracking AF function.

In this drawing, a zoom information acquisition section 201 acquires the information regarding a zooming operation input through the operating unit 142. For example, the zoom information acquisition section 201 acquires the information specifying both a zoom direction of zoom-in or zoom-out and a zoom speed.

A subject information acquisition section 202 acquires the information regarding a subject detected by the subject detection unit 131. For example, the subject information acquisition section 202 acquires the information which specifies the coordinate position of the upper left corner of the AF tracking frame 183 or the AF tracking frame 193 shown in FIG. 2 and the area of the AF tracking frame 183 or the AF tracking frame 193.

A threshold value setting section 203 sets a threshold value for determining whether or not to release the subject tracking AF function in a predetermined situation during the zooming operation. For example, the threshold value setting section 203 sets the value of a predetermined zoom speed as a threshold value for determining whether or not to release the subject tracking AF function.

For example, when a user performs a zooming operation at low zoom speed, a change in the angle of view caused by the zooming operation becomes gentle. As a result, it is thought that time required for the subject detection unit 131 to detect a subject (for example, the face of a person) is short. In addition, in the case of the low zoom speed, the user who is a photographer can perform an operation carefully. For this reason, it is thought that the possibility that the face of a person to be photographed will leave the screen due to the change in the angle of view according to the zooming operation is low.

Taking the above-described situation into consideration, the threshold value setting section 203 sets the value of a predetermined zoom speed as a threshold value for determining whether or not to release the subject tracking AF function, for example.

For example, a switching determination section 204 determines whether or not to release the subject tracking AF function on the basis of the information specifying the zoom direction and the zoom speed, which is acquired by the zoom information acquisition section 201, and the threshold value set by the threshold value setting section 203. That is, when the switching determination section 204 determines that the subject tracking AF function is released, the AF function of the digital camera 100 is changed from the subject tracking AF function to the normal AF function.

Moreover, in the following explanation, controlling the operations of the focus lens driving motor 111 and the zoom lens driving motor 112 according to the subject tracking AF function is appropriately called focusing in a subject tracking AF mode. Moreover, controlling the operations of the focus lens driving motor 111 and the zoom lens driving motor 112 according to the normal AF function is called focusing in a normal AF mode.

Figure 4:
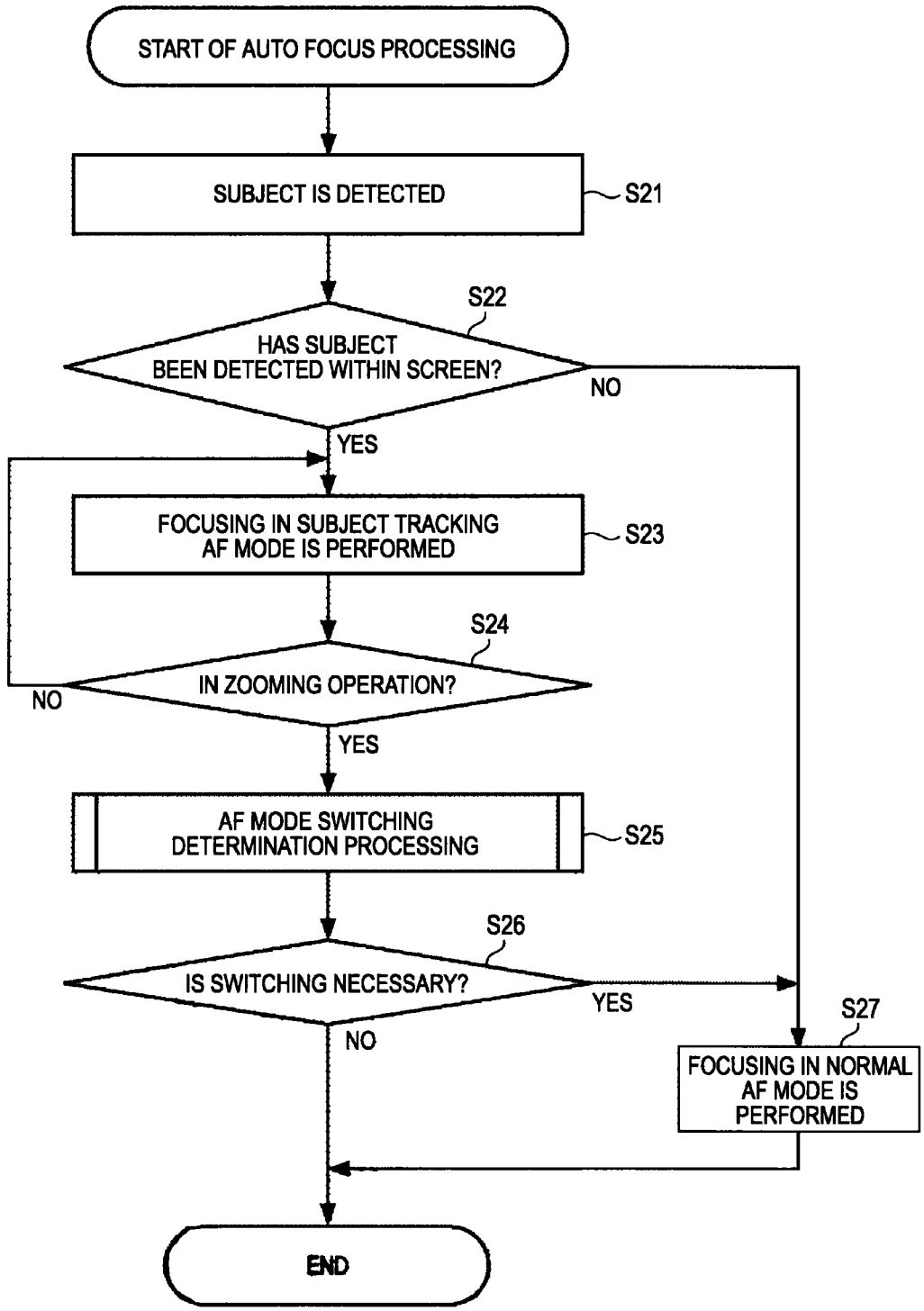
FIG. 4 is a flow chart explaining auto focus processing.

Next, an example of auto focus (AF) processing in the digital camera 100 will be described with reference to the flow chart in FIG. 4. This processing is executed when an image is photographed by the digital camera 100.

In step S21, the subject detection unit 131 detects a subject. In this case, for example, the subject in the image data is detected by analyzing the image data, which is output through the processing of the analog signal processing unit 103 to the digital signal processing unit 105, on the basis of the light input through the imaging lens 101. For example, an image of the face of a person in the image data is detected as a subject on the basis of the feature quantity of an image, model data stored in advance, and the like.

In step S22, the control unit 141 determines whether or not a subject (in this case, the face of a person) has been detected within the screen as a result of the processing of step S21. For example, when it is determined that the face of a person has been detected within the screen, the process proceeds to step S23.

In step S23, the control unit 141 controls the operations of the focus lens driving motor 111 and the zoom lens driving motor 112 to perform the focusing in the subject tracking AF mode. Accordingly, as described above, an image is photographed by making the focus follow the face of a person.

In step S24, the control unit 141 determines whether or not a zooming operation is being performed currently. For example, the control unit 141 determines whether or not a zooming operation is being performed on the basis of an operation signal corresponding to the command input through the operating unit 142 by the user. When it is determined that the zooming operation is being performed in step S24, the process proceeds to step S25.

In step S25, the control unit 141 executes AF mode switching determination processing, which will be described later. Through this processing, a switching flag indicating whether or not AF mode switching is necessary is set.

In step S26, the control unit 141 determines whether or not AF mode switching is necessary on the basis of the switching flag set by the processing of step S25. For example, when the switching flag is set to ON, it is determined that the AF mode switching is necessary in step S26. When the switching flag is set to OFF, it is determined that the AF mode switching is not necessary in step S26.

When it is determined that the AF mode switching is necessary in step S26, the process proceeds to step S27.

In step S27, the control unit 141 controls the operations of the focus lens driving motor 111 and the zoom lens driving motor 112 to perform the focusing in the normal AF mode. That is, the AF mode of the digital camera 100 is changed from the subject tracking AF mode to the normal AF mode.

Accordingly, an image is photographed so as to focus on an object located in the middle of the image, for example.

On the other hand, when it is determined that the AF mode switching is not necessary in step S26, the process ends.

In addition, in step S22, when it is determined that a subject (in this case, the face of a person) has not been detected within the screen as a result of the processing of step S21, processing of steps S23 to S26 is skipped, and the process proceeds to step S27.

In addition, when it is determined that the zooming operation is not being performed in step S24, the process returns to step S23.

In this manner, the auto focus processing is executed.

Figure 5:
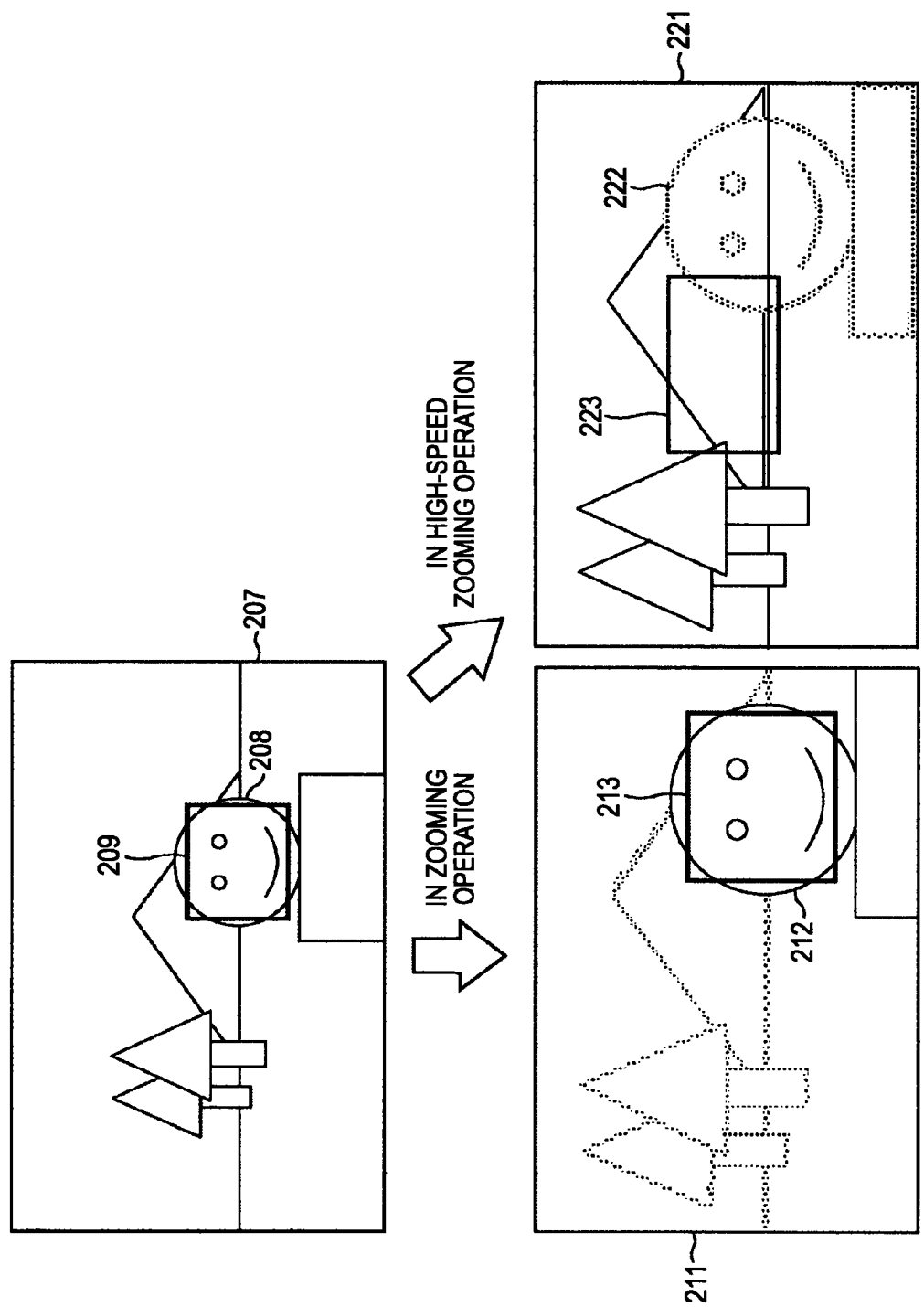
FIG. 5 is a view explaining AF mode switching when a zooming operation is performed.

In the auto focus processing of the digital camera 100, AF mode switching is performed as shown in FIG. 5, for example.

FIG. 5 is a view explaining the AF mode switching when a zooming operation is performed in the digital camera 100.

In this drawing, each of images 207, 211, and 221 is an image photographed by the digital camera 100. In the images 207, 211, and 221, a person as a main subject and a mountain and trees as the background are photographed.

In addition, each of the images 211 and 221 is an image photographed as a result when a user performs a zooming operation in a state where the image 207 is photographed. That is, the image 211 or 221 is photographed when the user of the digital camera 100 performs a zoom-in operation by operating the operating unit 142 in a state where the image 207 is photographed. Therefore, in the images 211 and 221, an image of the person is displayed as larger compared with the image 207.

In addition, in the images 207, 211, and 221, faces 208, 212, and 222 of the person as a subject are photographed, respectively. In addition, zoom magnifications of the faces 208, 212, and 222 are different, and the faces 208, 212, and 222 are the face of the same person.

AF tracking frames 209, 213, and 223, which are rectangular frames for displaying the subject detected by the subject detection unit 131, are displayed on the images 207, 211, and 221, respectively.

In the example shown in FIG. 5, the image 211 is photographed when the user performs a zooming operation at low zoom speed by operating the operating unit 142 in a state where the image 207 is photographed. In addition, the image 221 is photographed when the user performs a zooming operation at high zoom speed by operating the operating unit 142 in a state where the image 207 is photographed.

In the example shown in this drawing, in the image 211, the position of the AF tracking frame 213 matches the position of the face 212 of the person. Accordingly, an image is photographed in a state where the focus follows the face of the person. For this reason, in the image 211, the face 212 of the person is displayed clearly although the mountain and trees in the background are displayed unclearly compared with the image 207.

On the other hand, in the image 221, the AF tracking frame 223 is located in the middle of the screen. Accordingly, the position of the AF tracking frame 223 does not match the position of the face 222 of the person. For this reason, in the image 221, the mountain in the background is displayed clearly although the face 222 of the person is displayed unclearly compared with the image 207.

That is, in the example shown in FIG. 5, a user performs a zooming operation at high speed exceeding a threshold value and accordingly, AF mode switching is performed to photograph the image 221. That is, the image 211 is an image photographed as an image focused in the subject tracking AF mode, and the image 221 is an image photographed as an image focused in the normal AF mode.

Figure 6:
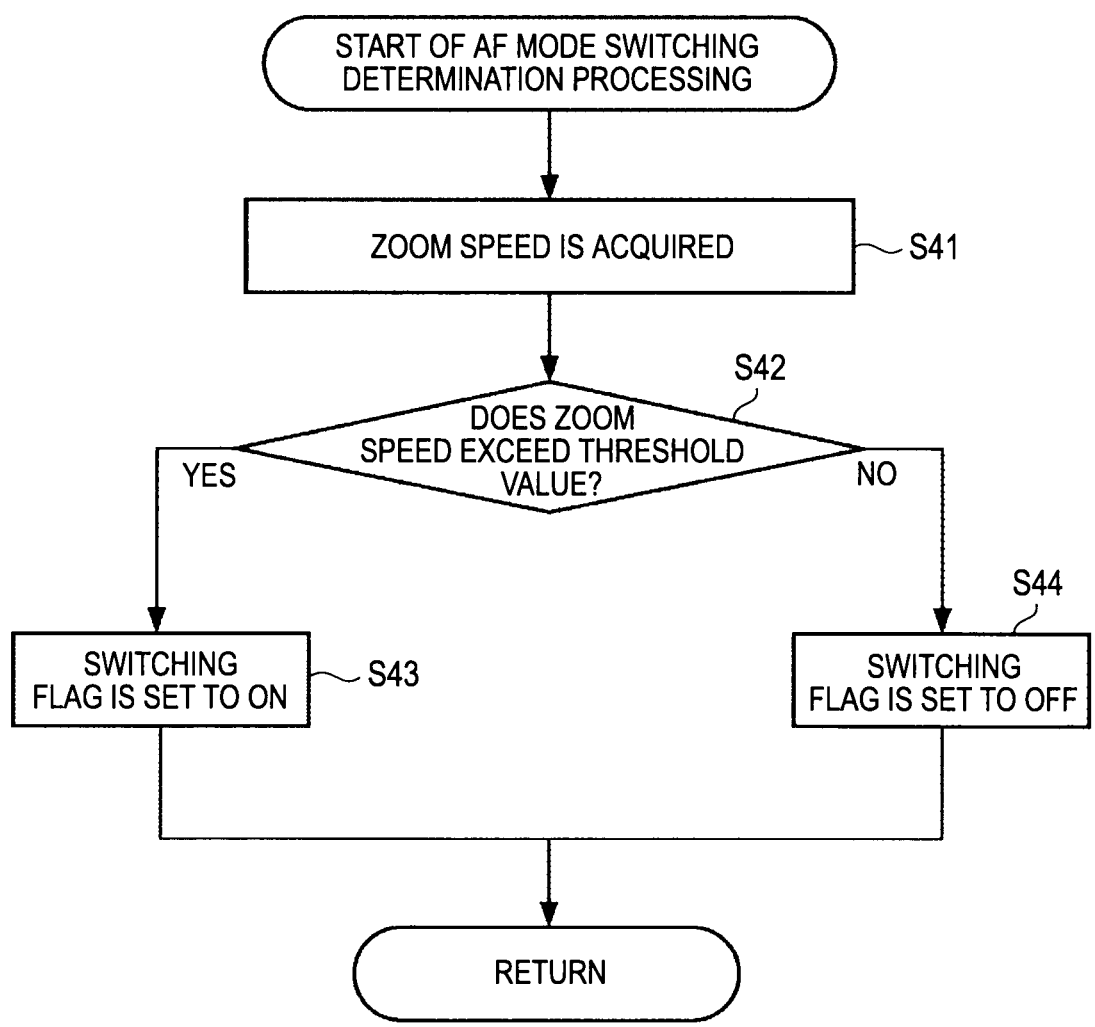
FIG. 6 is a flow chart explaining an example of AF mode switching determination processing corresponding to FIG. 5.

FIG. 6 is a flow chart explaining an example of AF mode switching determination processing when AF mode switching is performed, as described above with reference to FIG. 5. This processing is an example of processing executed as the processing of step S25 in FIG. 4.

In step S41, the zoom information acquisition section 201 acquires the information specifying the zoom speed on the basis of a signal input through the operating unit 142.

In step S42, the switching determination section 204 determines whether or not the zoom speed acquired in the processing of step S41 exceeds the threshold value. In addition, it is assumed that the threshold value of the zoom speed is set by the threshold value setting section 203 in advance.

When it is determined that the zoom speed exceeds the threshold value in step S42, the process proceeds to step S43.

In step S43, the switching determination section 204 sets the switching flag to ON. Then, in the processing of step S26 in FIG. 4, it is determined that switching is required, and the focusing in the normal AF mode is performed in step S27.

Accordingly, since the subject tracking AF function is released, focusing on the object located in the middle of the screen is realized. Therefore, the image 221 is photographed when a zooming operation is performed at high zoom speed (speed exceeding a threshold value) in a state where the image 207 in FIG. 5 is photographed, for example.

On the other hand, when it is determined that the zoom speed does not exceed the threshold value in step S42, the process proceeds to step S44.

In step S44, the switching determination section 204 sets the switching flag to OFF. Then, in the processing of step S26 in FIG. 4, it is determined that switching is not required, and the focusing in the subject tracking AF mode is performed as it is.

Therefore, the image 211 is photographed when a zooming operation is performed at low zoom speed (speed equal to or lower than a threshold value) in a state where the image 207 in FIG. 5 is photographed, for example.

In this way, the AF mode switching determination processing is executed.

Incidentally, in the example described with reference to FIG. 5, it is determined whether or not the AF mode switching is required by determining whether or not the zoom speed exceeds the threshold value. However, the threshold value of the zoom speed may be set differently according to the zoom direction.

For example, when a zoom-in operation is performed as a zooming operation, the area of an image of the face of a person who is a subject is increased. Accordingly, the face of the person may leave the screen. In addition, in the case of zoom-in, the face of the person is displayed in an enlarged manner. For this reason, since the influence of hand shaking is large, it is difficult to make the focus follow the subject. For this reason, in the case of zoom-in, it is thought that the threshold value of the zoom speed for determination of AF mode switching needs to be set to a low value.

However, when a zoom-out operation is performed as a zooming operation, the area of an image of the face of a person who is a subject is reduced. Accordingly, the possibility that the face of the person will leave the screen is low. In addition, in the case of zoom-out, the influence of hand shaking is small. Accordingly, it can also be said that it is relatively easy to make the focus follow the subject. For this reason, in the case of zoom-out, it is thought that the threshold value of the zoom speed for determination of AF mode switching needs to be set to the high value.

Figure 7:
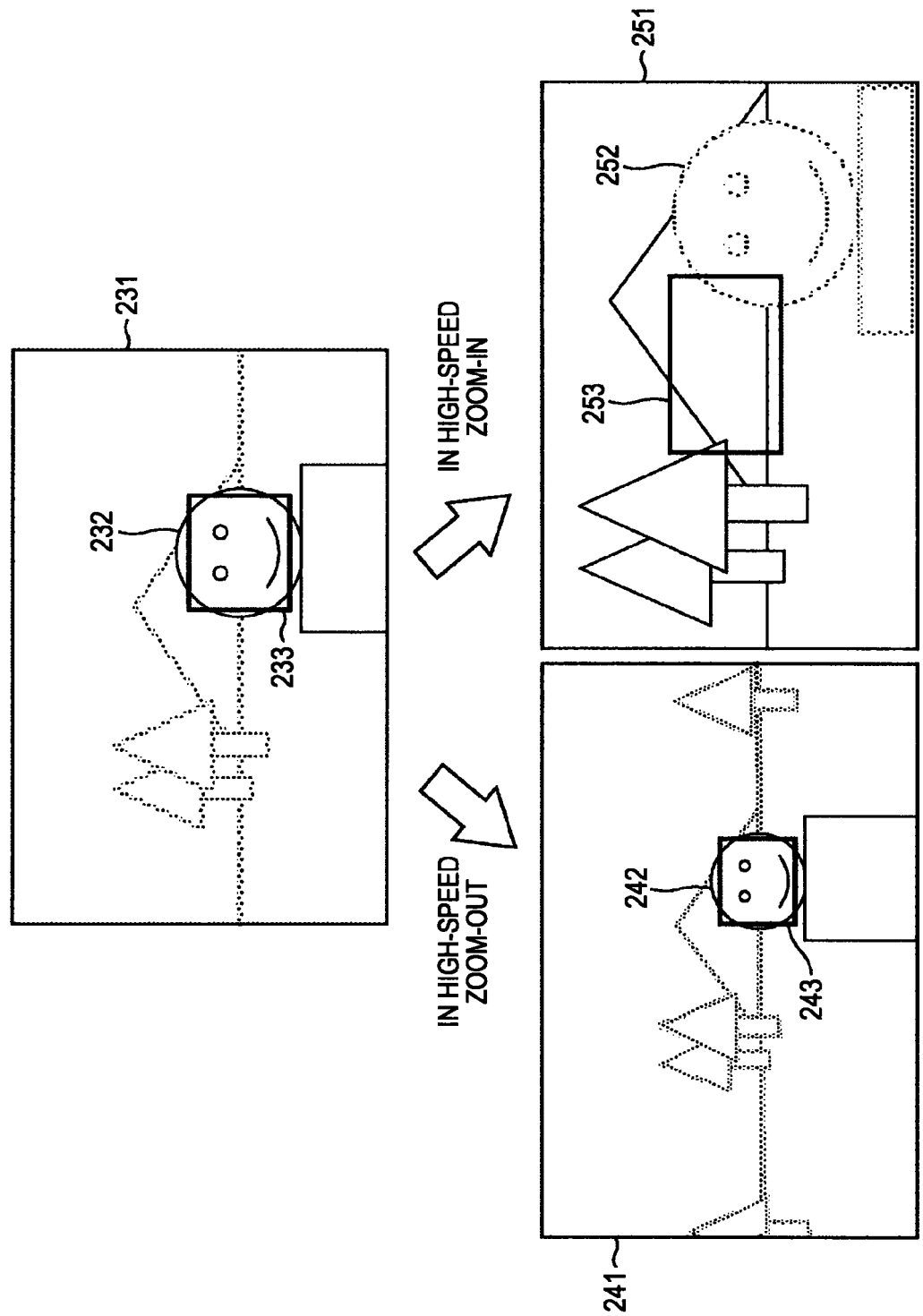
FIG. 7 is a view explaining another method of AF mode switching when a zooming operation is performed.

FIG. 7 is a view explaining another method of the AF mode switching when a zooming operation is performed in the digital camera 100.

In this drawing, each of images 231, 241, and 251 is an image photographed by the digital camera 100. In the images 231, 241, and 251, a person as a main subject and a mountain and trees as the background are photographed.

In addition, each of the images 241 and 251 is an image photographed as a result when a user performs a zooming operation in a state where the image 231 is photographed. That is, the image 251 is photographed when the user of the digital camera 100 performs a zoom-in operation by operating the operating unit 142 in a state where the image 231 is photographed. In addition, the image 241 is photographed when the user of the digital camera 100 performs a zoom-out operation by operating the operating unit 142 in a state where the image 231 is photographed. Therefore, an image of the person is displayed as larger in the image 251 compared with the image 231, and an image of the person is displayed as smaller in the image 241 compared with the image 231.

In addition, in the images 231, 241, and 251, faces 232, 242, and 252 of the person as a subject are photographed, respectively. In addition, zoom magnifications of the faces 232, 242, and 252 are different, and the faces 232, 242, and 252 are the face of the same person.

AF tracking frames 233, 243, and 253, which are rectangular frames for displaying the subject detected by the subject detection unit 131, are displayed on the images 231, 241, and 251, respectively.

In the example shown in FIG. 7, the zoom speed corresponding to the user operation is the same in both the cases of zoom-in and zoom-out. That is, the image 251 is photographed when a zoom-in operation is performed at a predetermined zoom speed in a state where the image 231 is photographed, and the image 241 is photographed when a zoom-out operation is performed at the same zoom speed in a state where the image 231 is photographed.

In the example shown in this drawing, in the image 241, the position of the AF tracking frame 243 matches the position of the face 242 of the person. Accordingly, an image is photographed in a state where the focus follows the face of a person. For this reason, in the image 241, the face 242 of the person is clearly displayed.

On the other hand, in the image 251, the AF tracking frame 253 is located in the middle of the screen. Accordingly, the position of the AF tracking frame 253 does not match the position of the face 252 of the person. For this reason, in the image 251, the mountain in the background is displayed clearly although the face 252 of the person is displayed unclearly compared with the image 231.

In the example shown in FIG. 7, a user performs a zoom-in operation at high speed exceeding a threshold value and accordingly, AF mode switching is performed to photograph the image 251. That is, the image 231 is an image photographed as an image focused in the subject tracking AF mode, and the image 251 is an image photographed as an image focused in the normal AF mode.

In the example shown in FIG. 7, however, AF mode switching is not performed even if the zoom-out operation is performed at the same zoom speed as the zooming operation corresponding to the image 251. That is, the image 241 is an image photographed as an image focused in the subject tracking AF mode.

That is, in the example shown in FIG. 7, when a zoom-out operation is performed as a zooming operation, the threshold value of the zoom speed for determination of AF mode switching is set to a high value. This is because in the case of zoom-out, the area of an image of the face of a person who is a subject is reduced and the possibility that the face of the person will leave the screen is accordingly low and the influence of hand shaking is small and it is relatively easy to make the focus follow the subject accordingly.

Figure 8:
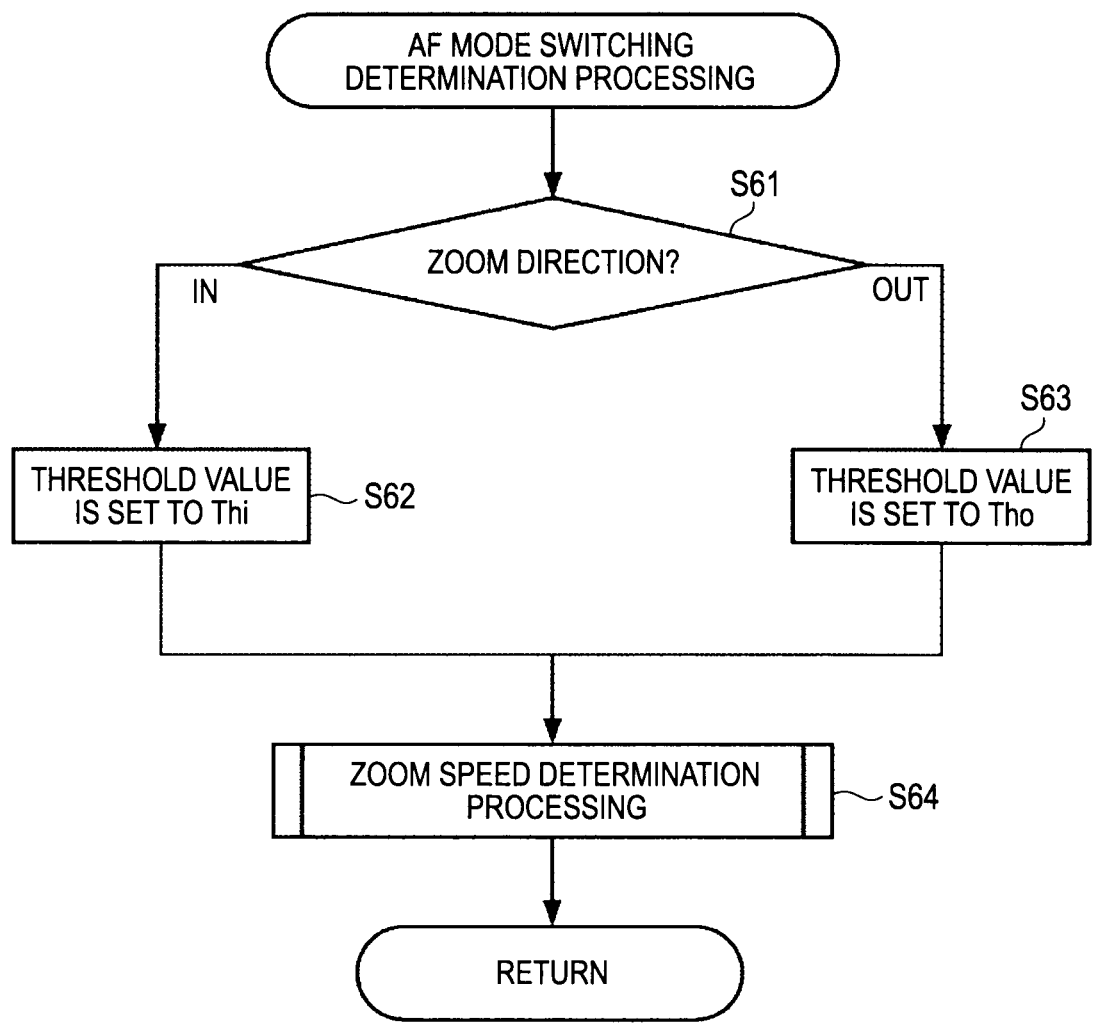
FIG. 8 is a flow chart explaining an example of AF mode switching determination processing corresponding to FIG. 7.

FIG. 8 is a flow chart explaining an example of AF mode switching determination processing when AF mode switching is performed, as described above with reference to FIG. 7. This processing is an example of processing executed as the processing of step S25 in FIG. 4.

In step S61, the zoom information acquisition section 201 determines a zoom direction on the basis of the information specifying the zoom direction of a zooming operation, which is acquired on the basis of a signal input through the operating unit 142.

When it is determined that a zoom-in operation is performed in step S61, the process proceeds to step S62 in which the threshold value setting section 203 sets a threshold value Thi corresponding to the zoom-in operation.

On the other hand, when it is determined that a zoom-out operation is performed in step S61, the process proceeds to step S63 in which the threshold value setting section 203 sets a threshold value Tho corresponding to the zoom-out operation.

In addition, the threshold value Thi is set to a lower value than the threshold value Tho. That is, even if the operation is performed at the same zoom speed, it is determined that the zoom speed exceeds the threshold value in the case of zoom-in, and it is determined that the zoom speed does not exceed the threshold value in the case of zoom-out.

After the processing of step S62 or S63, the process proceeds to step S64.

In step S64, the control unit 141 executes zoom speed determination processing. Accordingly, it is determined whether or not the zoom speed exceeds the threshold value. In addition, since detailed explanation regarding the zoom speed determination processing of step S64 is the same as for the processing described above with reference to FIG. 6, the explanation will be omitted. In this case, however, the threshold value used for determination in the processing of step S42 is set differently according to the zoom direction.

Therefore, for example, a user performs a zoom-in operation at high-speed exceeding a threshold value in a state where the image 231 of FIG. 7 is photographed and accordingly, AF mode switching is performed to photograph the image 251. On the other hand, even if the user performs a zoom-out operation at the same zoom speed as the zooming operation corresponding to the image 251 in a state where the image 231 is photographed, AF mode switching is not performed and the image 241 focused in the subject tracking AF mode is photographed.

The AF mode switching determination processing may also be executed in this way. Thus, it is possible to realize higher operability for a user than in the AF mode switch determination processing described above with reference to FIG. 6, for example.

In the above explanation, when performing a zooming operation at high zoom speed, the face of a person to be photographed may leave the screen due to a change in the angle of view according to the zooming operation. Accordingly, it is difficult to perform focusing in the subject tracking AF mode. However, depending on where a subject (for example, the face of a person) is located within the screen, a situation where the subject leaves the screen due to the change in the angle of view according to the zooming operation changes.

For example, it is thought that the possibility that the face of a person will leave the screen is low even if a zooming operation is performed at high zoom speed in a state where an image of the face of a person is displayed in the middle of the screen. That is, when a zooming operation is performed at high zoom speed in a state where an image of the face of a person is displayed at the edge of the screen or the like, a problem easily occurs in that the face of the person leaves the screen due to a change in the angle of view according to the zooming operation.

For this reason, it is thought that the threshold value of the zoom speed for determination of AF mode switching is set to the high value when the zooming operation is performed in a state where the image of the face of the person is displayed in the middle of the screen.

Figure 9:
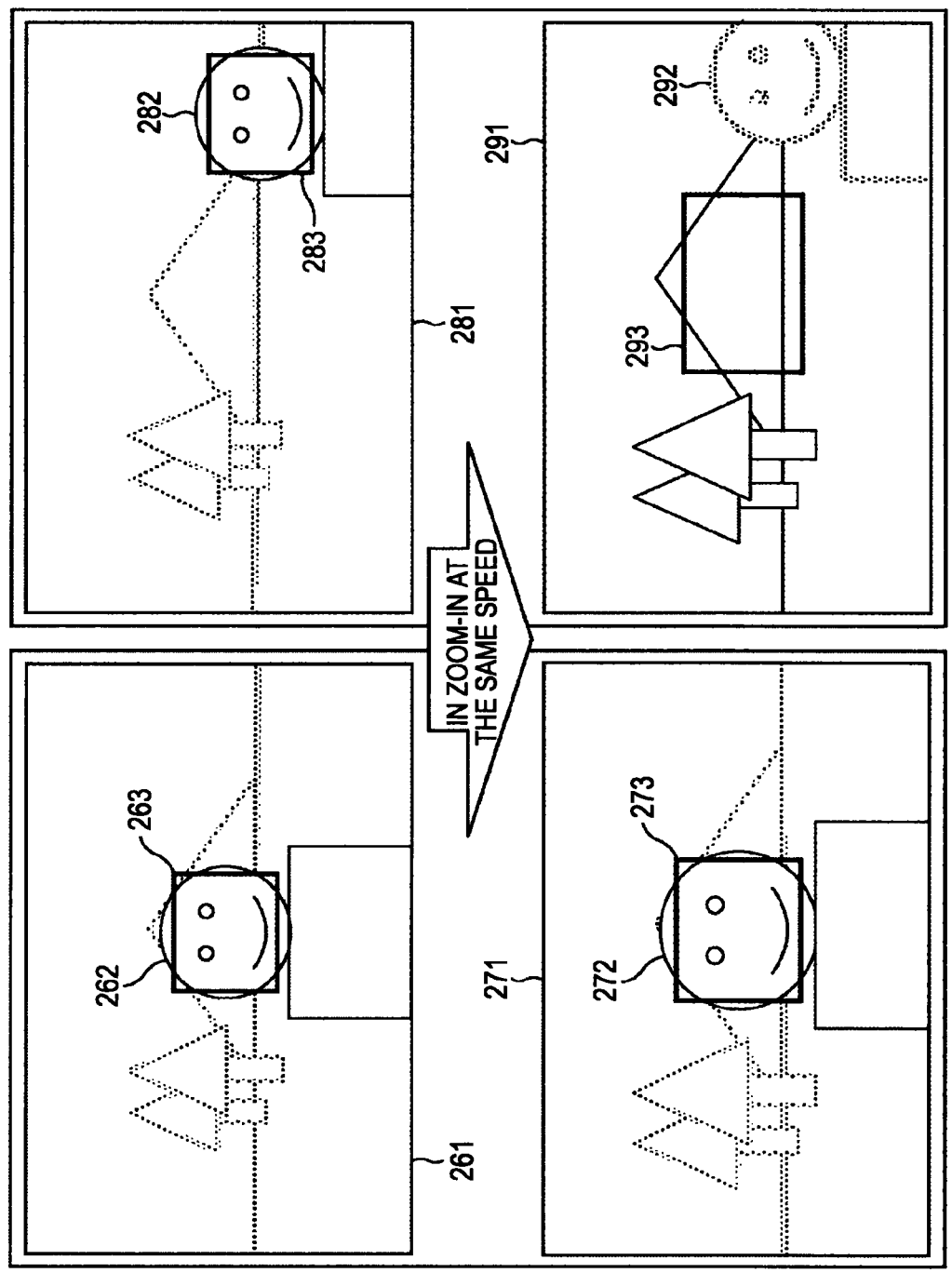
FIG. 9 is a view explaining still another method of AF mode switching when a zooming operation is performed.

FIG. 9 is a view explaining still another method of the AF mode switching when a zooming operation is performed in the digital camera 100.

In this drawing, each of images 261, 271, 281, and 291 is an image photographed by the digital camera 100. In the images 261, 271, 281, and 291, a person as a main subject and a mountain and trees as the background are photographed.

In addition, the images 271 and 291 are images photographed as a result when a user performs a zooming operation in a state where the images 261 and 281 are photographed, respectively. That is, the image 271 is photographed when the user of the digital camera 100 performs a zoom-in operation by operating the operating unit 142 in a state where the image 261 is photographed. In addition, the image 291 is photographed when the user of the digital camera 100 performs a zoom-in operation by operating the operating unit 142 in a state where the image 281 is photographed. Therefore, in the image 271 or 291, an image of the person is displayed as larger compared with the image 261 or 281.

In addition, in the images 261, 271, 281, and 291, faces 262, 272, 282, and 292 of the person as a subject are photographed, respectively. In addition, the faces 262, 272, 282, and 292 are faces of the same person.

AF tracking frames 263, 273, 283, and 293, which are rectangular frames for displaying the subject detected by the subject detection unit 131, are displayed on the images 261, 271, 281, and 291, respectively.

In addition, the face 262 is displayed in the middle of the screen in the image 261, while the face 282 is displayed at the edge of the screen in the image 281.

In the example shown in FIG. 9, the zoom speed corresponding to the user operation is the same in both a zooming operation from the image 261 to the image 271 and a zooming operation from the image 281 to the image 291. That is, the image 271 is photographed when a zoom-in operation is performed at the predetermined zoom speed in a state where the image 261 is photographed. In addition, the image 291 is photographed when a zoom-in operation is performed at the same zoom speed in a state where the image 281 is photographed.

In the example shown in this drawing, in the image 271, the position of the AF tracking frame 273 is the same as the position of the face 272 of the person. Accordingly, an image is photographed in a state where the focus follows the face of the person. For this reason, in the image 271, the face 272 of the person is clearly displayed.

On the other hand, in the image 291, the AF tracking frame 293 is located in the middle of the screen. Accordingly, the position of the AF tracking frame 293 does not match the position of the face 292 of the person. For this reason, in the image 291, the mountain in the background is displayed clearly although the face 292 of the person is displayed unclearly compared with the image 281.

In the example shown in FIG. 9, a user performs a zooming operation at high speed exceeding a threshold value and accordingly, AF mode switching is performed to photograph the image 291. That is, the image 281 is an image photographed as an image focused in the subject tracking AF mode, and the image 291 is an image photographed as an image focused in the normal AF mode.

In the example shown in FIG. 9, however, AF mode switching is not performed even if a zooming operation is performed at the same zoom speed as the zooming operation corresponding to the image 291 in a state where the image 261 is photographed. That is, the image 271 is an image photographed as an image focused in the subject tracking AF mode.

That is, in the example shown in FIG. 9, when a zooming operation is performed in a state where an image of the face of a person is displayed in the middle of the screen, the threshold value of the zoom speed for determination of AF mode switching is set to the high value. This is because it is thought that the possibility that the face of a person will leave the screen is low even if a zooming operation is performed at high zoom speed in a state where the image of the face of the person is displayed in the middle of the screen.

Figure 10:
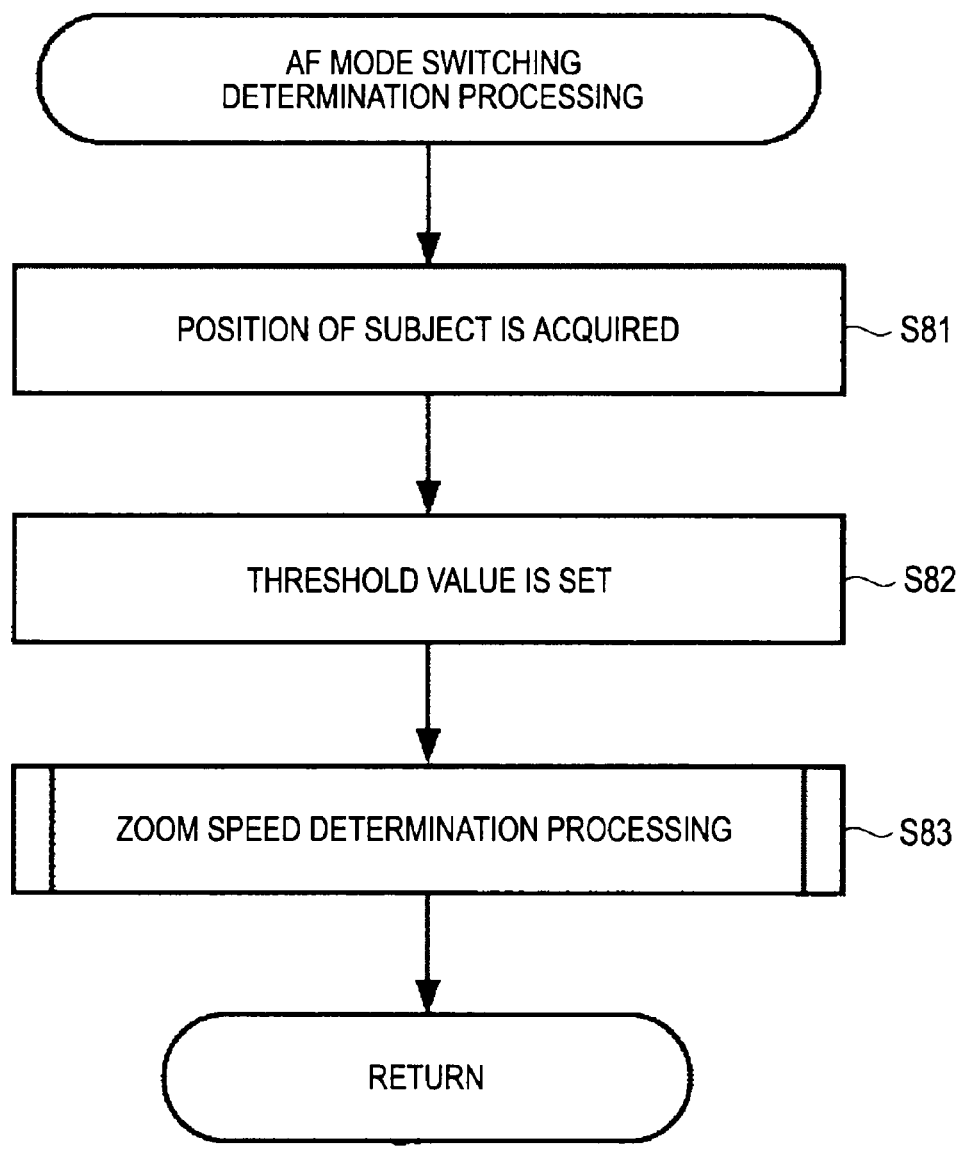
FIG. 10 is a flow chart explaining an example of AF mode switching determination processing corresponding to FIG. 9.

FIG. 10 is a flow chart explaining an example of AF mode switching determination processing when AF mode switching is performed, as described above with reference to FIG. 9. This processing is an example of processing executed as the processing of step S25 in FIG. 4.

In step S81, the subject information acquisition section 202 acquires the information specifying the position of the subject (for example, the face of a person) detected by the subject detection unit 131. In this case, for example, the information specifying the coordinate position of the upper left corner of the AF tracking frame 263 or 283 shown in FIG. 9 is acquired.

In step S82, the threshold value setting section 203 sets a threshold value corresponding to the position of the subject acquired in the processing of step S81. For example, a threshold value set in advance according to a distance between the position of a pixel in the middle of an AF tracking frame and the position of a pixel in the middle of the screen is selected and set. Alternatively, the threshold value may also be set by calculating a value to be subtracted from the default threshold value, for example, using a function which has as a parameter a value of the distance between the position of a pixel in the middle of the AF tracking frame and the position of a pixel in the middle of the screen.

In step S83, the control unit 141 executes zoom speed determination processing. Accordingly, it is determined whether or not the zoom speed exceeds the threshold value. In addition, since detailed explanation regarding the zoom speed determination processing of step S83 is the same as for the processing described above with reference to FIG. 6, the explanation will be omitted. In this case, however, the threshold value used for determination in the processing of step S42 is set differently according to the position of the subject.

Therefore, for example, a user performs a zooming operation at high speed exceeding a threshold value in a state where the image 281 of FIG. 9 is photographed and accordingly, AF mode switching is performed to photograph the image 291. On the other hand, even if the user performs a zooming operation at the same zoom speed as the zooming operation corresponding to the image 291 in a state where the image 261 is photographed, AF mode switching is not performed and the image 271 focused in the subject tracking AF mode is photographed.

The AF mode switching determination processing may also be executed in this way. Thus, it is possible to realize higher operability for a user than in the AF mode switch determination processing described above with reference to FIG. 6, for example.

In the example described above with reference to FIG. 9, however, when a zooming operation is performed at high zoom speed in a state where an image of the face of a person is displayed at the edge of the screen or the like, a problem easily occurs in that the face of the person leaves the screen due to a change in the angle of view according to the zooming operation.

However, even if the zooming operation is performed in a state where the image of the face of the person is displayed at the edge of the screen or the like, the possibility that the face of the person will leave the screen due to the zooming operation becomes low if the size of the image of the face of the person displayed originally is sufficiently small.

For this reason, it is thought that the threshold value of the zoom speed for determination of AF mode switching is set to the high value when the size of the image of the face of the person displayed originally is sufficiently small even if the image of the face of the person is displayed at the edge of the screen or the like.

Figure 11:
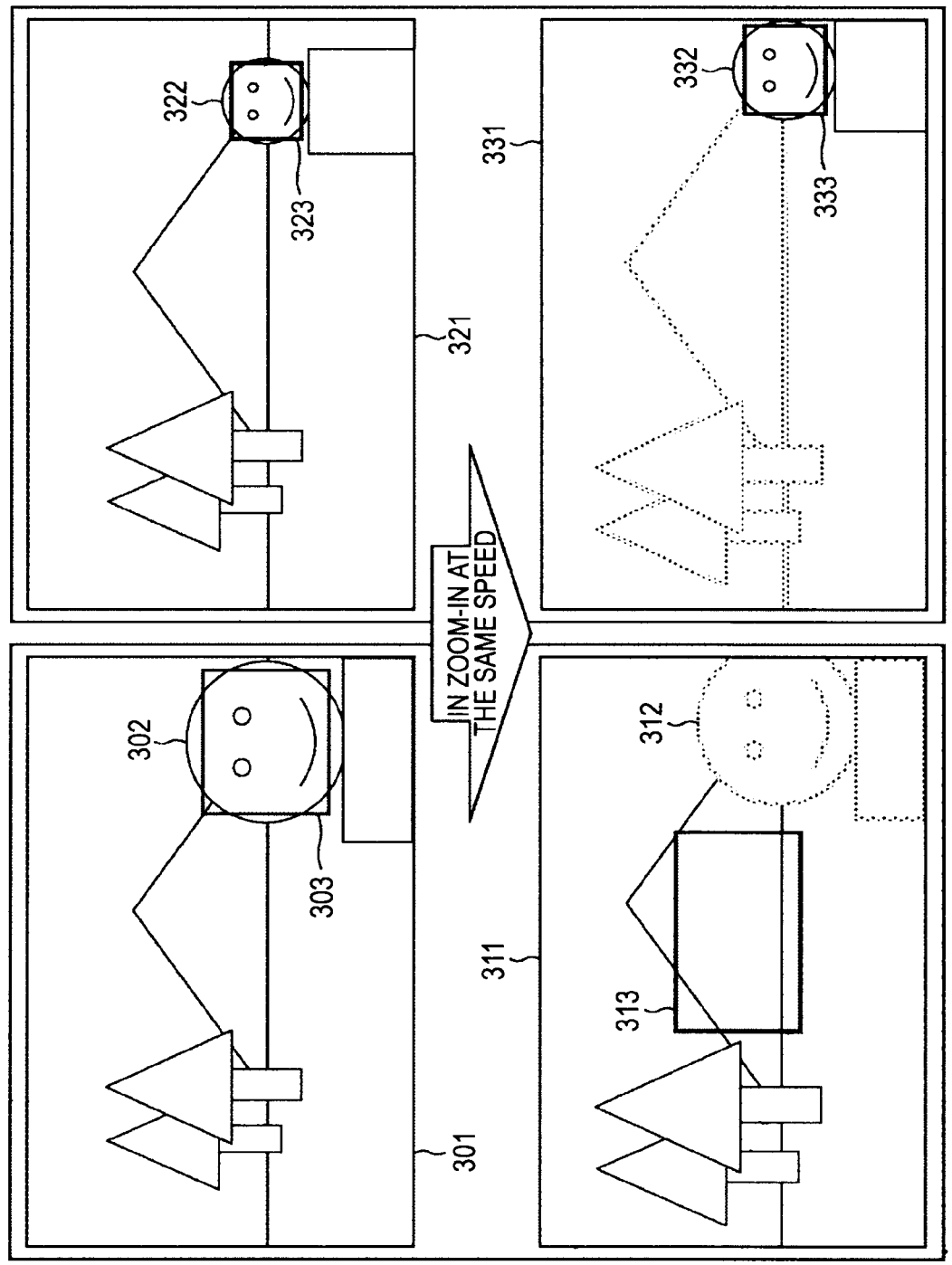
FIG. 11 is a view explaining still another method of AF mode switching when a zooming operation is performed.

FIG. 11 is a view explaining still another method of the AF mode switching when a zooming operation is performed in the digital camera 100.

Since images 301, 311, 321, and 331 in FIG. 11 are the same as the images 261, 271, 281, and 291 in FIG. 9, respectively, detailed explanation thereof will be omitted. In the case shown in FIG. 11, however, faces 302 and 322 are displayed at the edge of the screen in both the images 301 and 321. In addition, the size of an image of the face 322 displayed originally is sufficiently small in the image 321, but it cannot be said that the size of an image of the face 302 is sufficiently small in the image 301.

In the example shown in FIG. 11, in the image 331, the position of an AF tracking frame 333 matches the position of the face 332 of the person. Accordingly, an image is photographed in a state where the focus follows the face of the person. For this reason, in the image 331, the face 332 of the person is clearly displayed.

On the other hand, in the image 311, an AF tracking frame 313 is located in the middle of the screen. Accordingly, the position of the AF tracking frame 313 does not match the position of the face 312 of the person. For this reason, in the image 311, the mountain in the background is displayed clearly although the face 312 of the person is displayed unclearly compared with the image 301.

In the example shown in FIG. 11, a user performs a zooming operation at high speed exceeding a threshold value and accordingly, AF mode switching is performed to photograph the image 311. That is, the image 301 is an image photographed as an image focused in the subject tracking AF mode, and the image 311 is an image photographed as an image focused in the normal AF mode.

In the example shown in FIG. 11, however, AF mode switching is not performed even if a zooming operation is performed at the same zoom speed as the zooming operation corresponding to the image 311 in a state where the image 321 is photographed. That is, the image 331 is an image photographed as an image focused in the subject tracking AF mode.

That is, in the example shown in FIG. 11, when the size of the image of the face of the person displayed originally is sufficiently small even if the image of the face of the person is displayed at the edge of the screen or the like, the threshold value of the zoom speed for determination of AF mode switching is set to the high value. This is because it is thought that the possibility that the face of the person will leave the screen is low even if a zooming operation is performed at high zoom speed in such a case.

Figure 12:
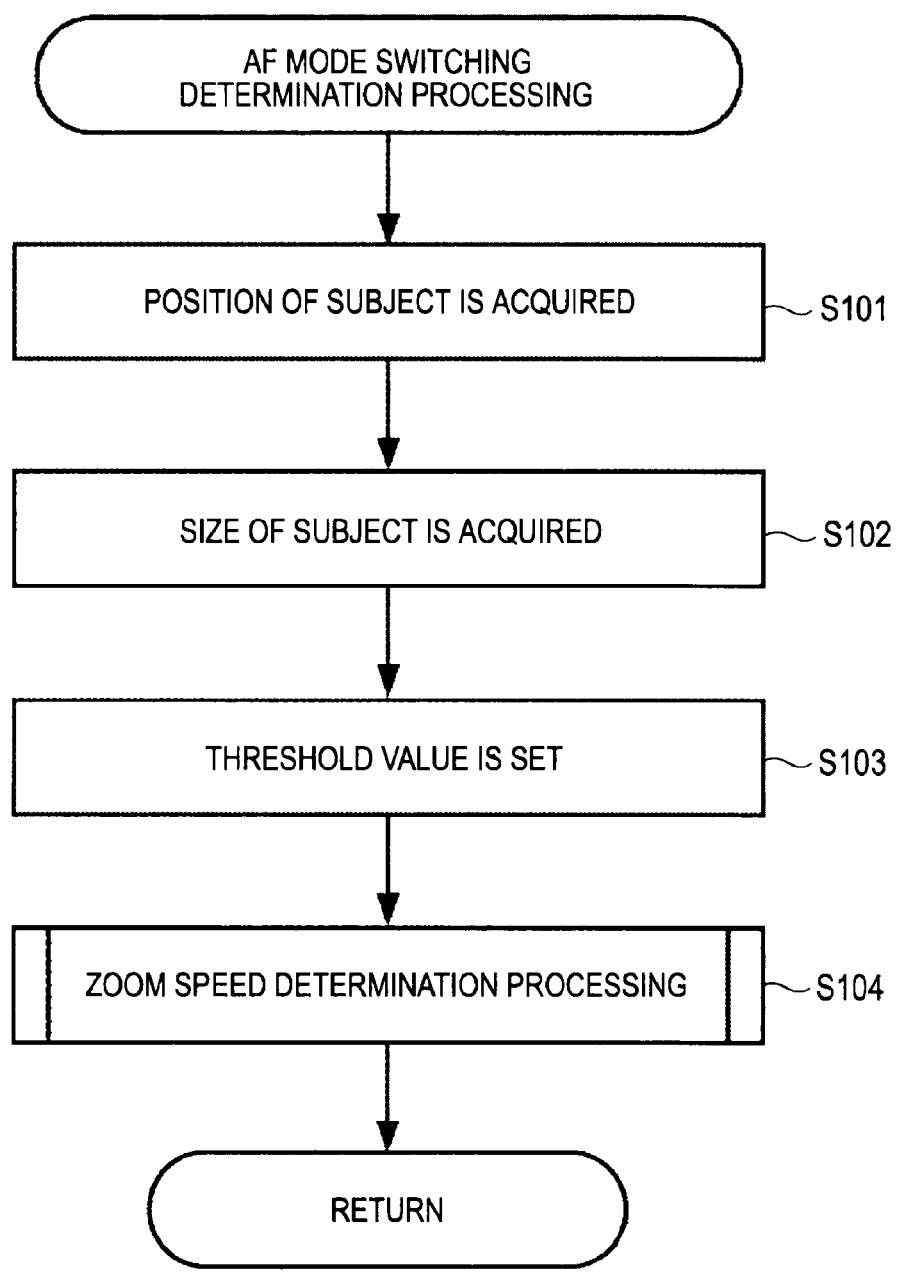
FIG. 12 is a flow chart explaining an example of AF mode switching determination processing corresponding to FIG. 11.

FIG. 12 is a flow chart explaining an example of AF mode switching determination processing when AF mode switching is performed, as described above with reference to FIG. 11. This processing is an example of processing executed as the processing of step S25 in FIG. 4.

In step S101, the subject information acquisition section 202 acquires the information specifying the position of the subject (for example, the face of a person) detected by the subject detection unit 131. In this case, for example, the information specifying the coordinate position of the upper left corner of the AF tracking frame 303 or 323 shown in FIG. 11 is acquired.

In step S102, the subject information acquisition section 202 acquires the information specifying the size of the subject detected by the subject detection unit 131. In this case, for example, the information specifying the area of the AF tracking frame 303 or 323 shown in FIG. 11 is acquired.

In step S103, the threshold value setting section 203 sets a threshold value corresponding to the position of the subject acquired in the processing of step S101 and the size of the subject acquired in the processing of step S102. For example, a threshold value set in advance according to a distance between the position of a pixel in the middle of an AF tracking frame and the position of a pixel in the middle of the screen and the area of the AF tracking frame is selected and set. Alternatively, the threshold value may also be set by calculating a value to be subtracted from the default threshold value, for example, using a function which has as a parameter a value of the distance between the position of a pixel in the middle of the AF tracking frame and the position of a pixel in the middle of the screen and a value of the area of the AF tracking frame.

In step S104, the control unit 141 executes zoom speed determination processing. Accordingly, it is determined whether or not the zoom speed exceeds the threshold value. In addition, since detailed explanation regarding the zoom speed determination processing of step S104 is the same as for the processing described above with reference to FIG. 6, the explanation will be omitted. In this case, however, the threshold value used for determination in the processing of step S42 is set differently according to the position and size of the subject.

Therefore, for example, a user performs a zooming operation at high speed exceeding a threshold value in a state where the image 301 of FIG. 11 is photographed and accordingly, AF mode switching is performed to photograph the image 311. On the other hand, even if the user performs a zooming operation at the same zoom speed as the zooming operation corresponding to the image 311 in a state where the image 321 is photographed, AF mode switching is not performed and the image 331 focused in the subject tracking AF mode is photographed.

The AF mode switching determination processing may also be executed in this way. Thus, it is possible to realize higher operability for a user than in the AF mode switch determination processing described above with reference to FIG. 10, for example.

In the example described above with reference to FIG. 9, however, when a zooming operation is performed at high zoom speed in a state where an image of the face of a person is displayed at the edge of the screen or the like, a problem easily occurs in that the face of the person leaves the screen due to a change in the angle of view according to the zooming operation. In addition, in the example described above with reference to FIG. 7, when a zoom-out operation is performed as a zooming operation, the threshold value of the zoom speed for determination of AF mode switching is set to the high value.

Then, it is thought that the threshold value of the zoom speed for determination of AF mode switching is set to the high value when a zoom-out operation is performed in a state where the image of the face of the person is displayed at the edge of the screen or the like. This is because it is thought that the possibility that the face of the person will leave the screen is low even if a zooming operation is performed at high zoom speed in such a case.

Figure 13:
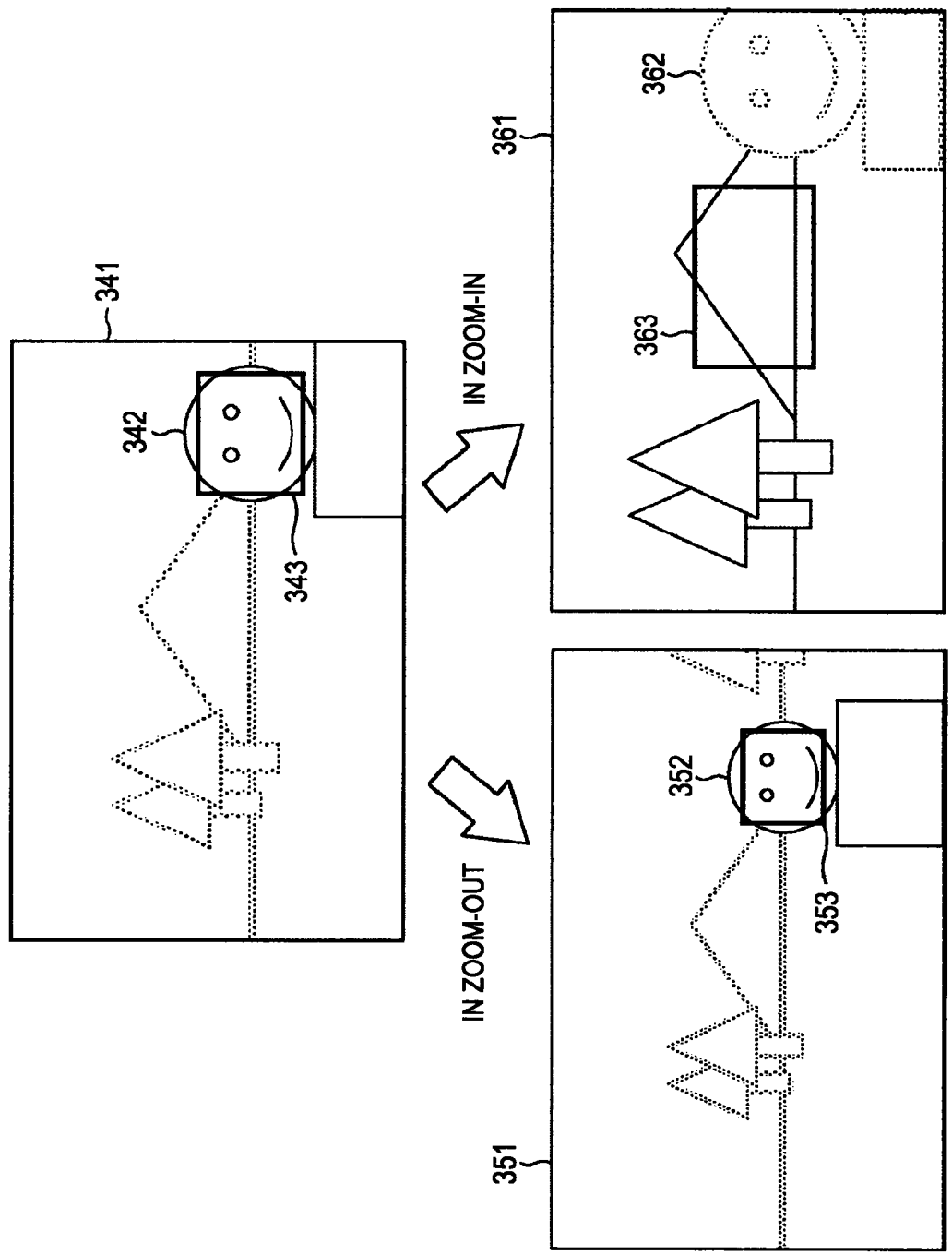
FIG. 13 is a view explaining still another method of AF mode switching when a zooming operation is performed.

FIG. 13 is a view explaining still another method of the AF mode switching when a zooming operation is performed in the digital camera 100.

Since images 341, 351, and 361 in FIG. 13 are the same as the images 231, 241, and 251 in FIG. 7, respectively, detailed explanation thereof will be omitted. In the case shown in FIG. 13, however, a face 342 is displayed at the edge of the screen in the image 341.

In the example shown in FIG. 13, in the image 351, the position of an AF tracking frame 353 matches the position of the face of a person 352. Accordingly, an image is photographed in a state where the focus follows the face of the person. For this reason, in the image 351, the face 352 of the person is clearly displayed.

On the other hand, in the image 361, an AF tracking frame 363 is located in the middle of the screen. Accordingly, the position of the AF tracking frame 363 does not match the position of the face 362 of the person. For this reason, in the image 361, the mountain in the background is displayed clearly although the face 362 of the person is displayed unclearly compared with the image 341.

In the example shown in FIG. 13, a user performs a zoom-in operation at high speed exceeding a threshold value and accordingly, AF mode switching is performed to photograph the image 361. That is, the image 341 is an image photographed as an image focused in the subject tracking AF mode, and the image 361 is an image photographed as an image focused in the normal AF mode.

In the example shown in FIG. 13, however, AF mode switching is not performed even if a zooming operation is performed at the same zoom speed as the zooming operation corresponding to the image 361 in a state where the image 341 is photographed. That is, the image 351 is an image photographed as an image focused in the subject tracking AF mode.

That is, in the example shown in FIG. 13, when a zoom-out operation is performed in a state where the image of the face of the person is displayed at the edge of the screen or the like, the threshold value of the zoom speed for determination of AF mode switching is set to the high value. This is because it is thought that the possibility that the face of the person will leave the screen is low even if a zooming operation is performed at high zoom speed in such a case.

Figure 14:
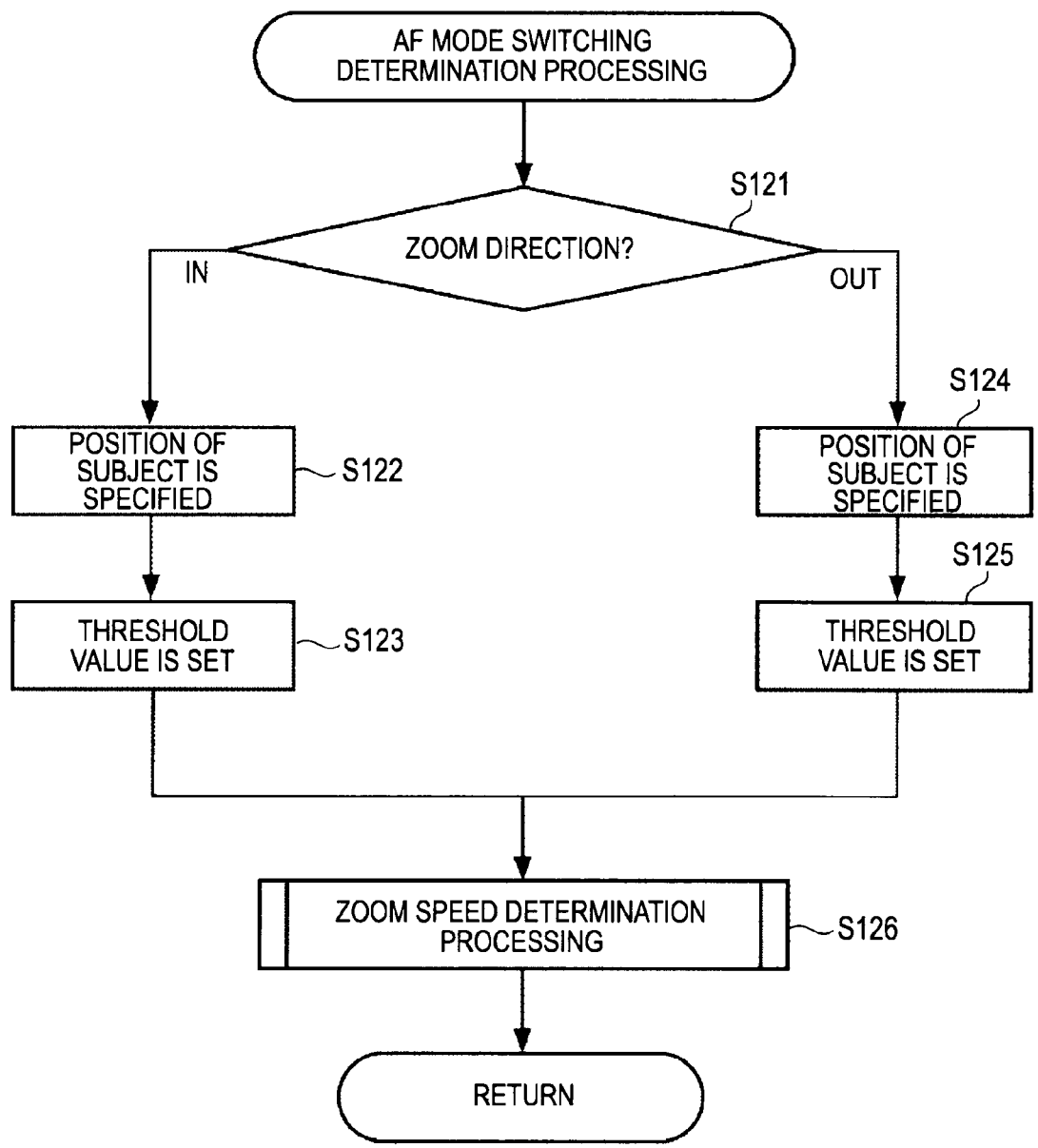
FIG. 14 is a flow chart explaining an example of AF mode switching determination processing corresponding to FIG. 13.

FIG. 14 is a flow chart explaining an example of AF mode switching determination processing when AF mode switching is performed, as described above with reference to FIG. 13. This processing is an example of processing executed as the processing of step S25 in FIG. 4.

In step S121, the zoom information acquisition section 201 determines a zoom direction on the basis of the information specifying the zoom direction of a zooming operation, which is acquired on the basis of a signal input through the operating unit 142.

When determination as zoom-in is made in step S121, the process proceeds to step S122 in which the subject information acquisition section 202 acquires the information specifying the position of the subject (for example, the face of a person) detected by the subject detection unit 131. In this case, for example, the information specifying the coordinate position of the upper left corner of the AF tracking frame 343 shown in FIG. 13 is acquired.

In step S123, the threshold value setting section 203 sets a threshold value corresponding to the position of the subject acquired in the processing of step S122. For example, a threshold value which is a threshold value corresponding to a zoom-in operation and which is set in advance according to a distance between the position of a pixel in the middle of an AF tracking frame and the position of a pixel in the middle of the screen is selected and set. Alternatively, the threshold value may also be set by calculating a value to be subtracted from the default threshold value, for example, using a function which has as a parameter a value of the distance between the position of a pixel in the middle of the AF tracking frame and the position of a pixel in the middle of the screen.

On the other hand, when determination as zoom-out is made in step S121, the process proceeds to step S124 in which the subject information acquisition section 202 acquires the information specifying the position of the subject (for example, the face of a person) detected by the subject detection unit 131. In this case, for example, the information specifying the coordinate position of the upper left corner of the AF tracking frame 343 shown in FIG. 13 is acquired.

In step S125, the threshold value setting section 203 sets a threshold value corresponding to the position of the subject acquired in the processing of step S124. For example, a threshold value which is a threshold value corresponding to a zoom-out operation and which is set in advance according to a distance between the position of a pixel in the middle of an AF tracking frame and the position of a pixel in the middle of the screen is selected and set. Alternatively, the threshold value may also be set by calculating a value to be subtracted from the default threshold value, for example, using a function which has as a parameter a value of the distance between the position of a pixel in the middle of the AF tracking frame and the position of a pixel in the middle of the screen.

In addition, the threshold value set in step S123 is a lower value than the threshold value set in step S125. That is, even if the position of a subject is the same and the operation is performed at the same zoom speed, it is determined that the zoom speed exceeds the threshold value in the case of zoom-in, and it is determined that the zoom speed does not exceed the threshold value in the case of zoom-out.

In step S126, the control unit 141 executes zoom speed determination processing. Accordingly, it is determined whether or not the zoom speed exceeds the threshold value. In addition, since detailed explanation regarding the zoom speed determination processing of step S126 is the same as for the processing described above with reference to FIG. 6, the explanation will be omitted. In this case, however, the threshold value used for determination in the processing of step S42 is set differently according to the zoom direction and the position of the subject.

Therefore, for example, a user performs a zoom-in operation at high speed exceeding a threshold value in a state where the image 341 of FIG. 13 is photographed and accordingly, AF mode switching is performed to photograph the image 361. On the other hand, even if the user performs a zoom-out operation at the same zoom speed as the zooming operation corresponding to the image 361 in a state where the image 341 is photographed, AF mode switching is not performed and the image 351 focused in the subject tracking AF mode is photographed.

The AF mode switching determination processing may also be executed in this way. Thus, it is possible to realize higher operability for a user than in the AF mode switch determination processing described above with reference to FIG. 8 or 10, for example.

Although the examples where the threshold value of the zoom speed for determination of AF mode switching is set according to the zoom direction, the position of the subject, and the size of the subject have been described above, the threshold value of the zoom speed may also be set according to a combination of these.

Until now, the examples where the threshold value of the zoom speed for determination of AF mode switching is set according to the zoom direction, the position of the subject, and the size of the subject have been described. The reason is as follows. The position or size of the subject within the screen is changed by a zooming operation. Accordingly, since it takes time to detect the subject or the subject leaves the screen in many cases, it is appropriate to set the threshold value according to the zoom direction, the position of the subject, and the size of the subject. In addition, it is thought that this is because when performing a zooming operation, the user who is a photographer pays attention to the background or other subjects, in many cases, rather than a person of a subject whose face has been detected.

However, for example, when a user designates a subject, it is difficult to consider that the user who is a photographer pays attention to the background or other subjects rather than a person of a subject whose face has been detected even if a zooming operation is performed.

That is, the above example has been described on the basis of the subject tracking AF mode when the subject detection unit 131 analyzes an image and detects automatically an image of the face of a person or the like as a subject. In the subject tracking AF mode when the subject detection unit 131 detects an object or the like corresponding to an image designated by the user automatically as a subject, however, AF mode switching when performing a zooming operation may be performed using another method.

Figure 15:
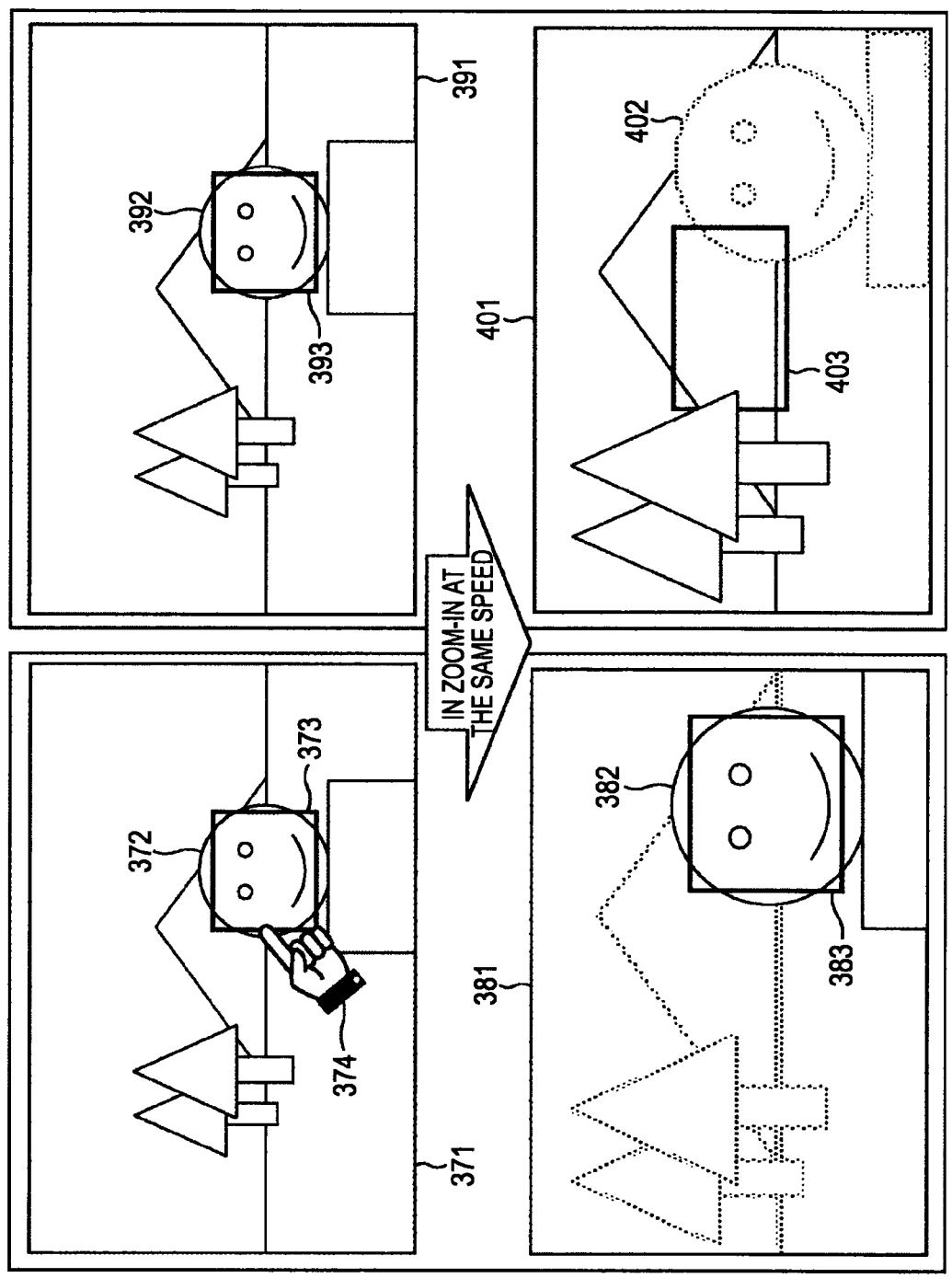
FIG. 15 is a view explaining still another method of AF mode switching when a zooming operation is performed.

FIG. 15 is a view explaining still another method of the AF mode switching when a zooming operation is performed in the digital camera 100.

In this drawing, each of images 371, 381, 391, and 401 is an image photographed by the digital camera 100. In the images 371, 381, 391, and 401, a person as a main subject and a mountain and trees as the background are photographed.

In addition, the images 381 and 401 are images photographed as a result when a user performs a zooming operation in a state where the images 371 and 391 are photographed, respectively. That is, the image 381 is photographed when the user of the digital camera 100 performs a zoom-in operation by operating the operating unit 142 in a state where the image 371 is photographed. In addition, the image 401 is photographed when the user of the digital camera 100 performs a zoom-in operation by operating the operating unit 142 in a state where the image 391 is photographed. Therefore, in the image 381 or 401, an image of the person is displayed as larger compared with the image 371 or 391.

In addition, faces 372, 382, 392, and 402 of the person as a subject detected by the subject detection unit 131 are photographed in the images 371, 381, 391, and 401, respectively. In addition, the faces 372, 382, 392, and 402 are faces of the same person. AF tracking frames 373, 383, 393, and 403, which are rectangular frames for displaying the subject, are displayed on the images 371, 381, 391, and 401, respectively.

The images 371 and 391 are images obtained by photographing the same person and the same background, and the position where the face of the person who is a subject is displayed is also the same. In addition, the images 381 and 401 are images zoomed in at the same speed, and the position where the face of the person who is a subject is displayed is also the same.

However, the AF tracking frames 373 and 383 in the images 371 and 381 are displayed when the subject detection unit 131 detects an object or the like corresponding to an image designated by the user automatically as a subject. In the image 371, an icon 374 is displayed and an image of the face 372 is designated by the icon 374. That is, in the image 371, a user selects (designates) the image of the face 372 as a subject.

In the example shown in FIG. 15, the zoom speed corresponding to the user operation is the same in both a zooming operation from the image 371 to the image 381 and a zooming operation from the image 391 to the image 401. That is, the image 381 is photographed when a zoom-in operation is performed at the predetermined zoom speed in a state where the image 371 is photographed. In addition, the image 401 is photographed when a zoom-in operation is performed at the same zoom speed in a state where the image 391 is photographed.

In the example shown in this drawing, in the image 381, the position of the AF tracking frame 383 is the same as the position of the face 382 of the person. Accordingly, an image is photographed in a state where the focus follows the face of the person. For this reason, in the image 381, the face 382 of the person is clearly displayed.

On the other hand, in the image 401, an AF tracking frame 403 is located in the middle of the screen. Accordingly, the position of the AF tracking frame 403 does not match the position of the face 402 of the person. For this reason, in the image 401, the mountain in the background is displayed clearly although the face 402 of the person is displayed unclearly compared with the image 391.

In the example shown in FIG. 15, a user performs a zooming operation at high-speed exceeding a threshold value in a state where the image 391 is photographed and accordingly, AF mode switching is performed to photograph the image 401. That is, the image 391 is an image photographed as an image focused in the subject tracking AF mode, and the image 401 is an image photographed as an image focused in the normal AF mode.

In the example shown in FIG. 15, however, AF mode switching is not performed even if a zooming operation is performed at the same zoom speed as the zooming operation corresponding to the image 381 in a state where the image 371 is photographed. That is, the image 381 is an image photographed as an image focused in the subject tracking AF mode.

That is, in the example shown in FIG. 15, when the subject corresponding to the image designated by the user is detected, the threshold value of the zoom speed for determination of AF mode switching is set to the high value. This is because it is thought that the possibility that the user pays attention to the subject is high in such a case.

Figure 16:
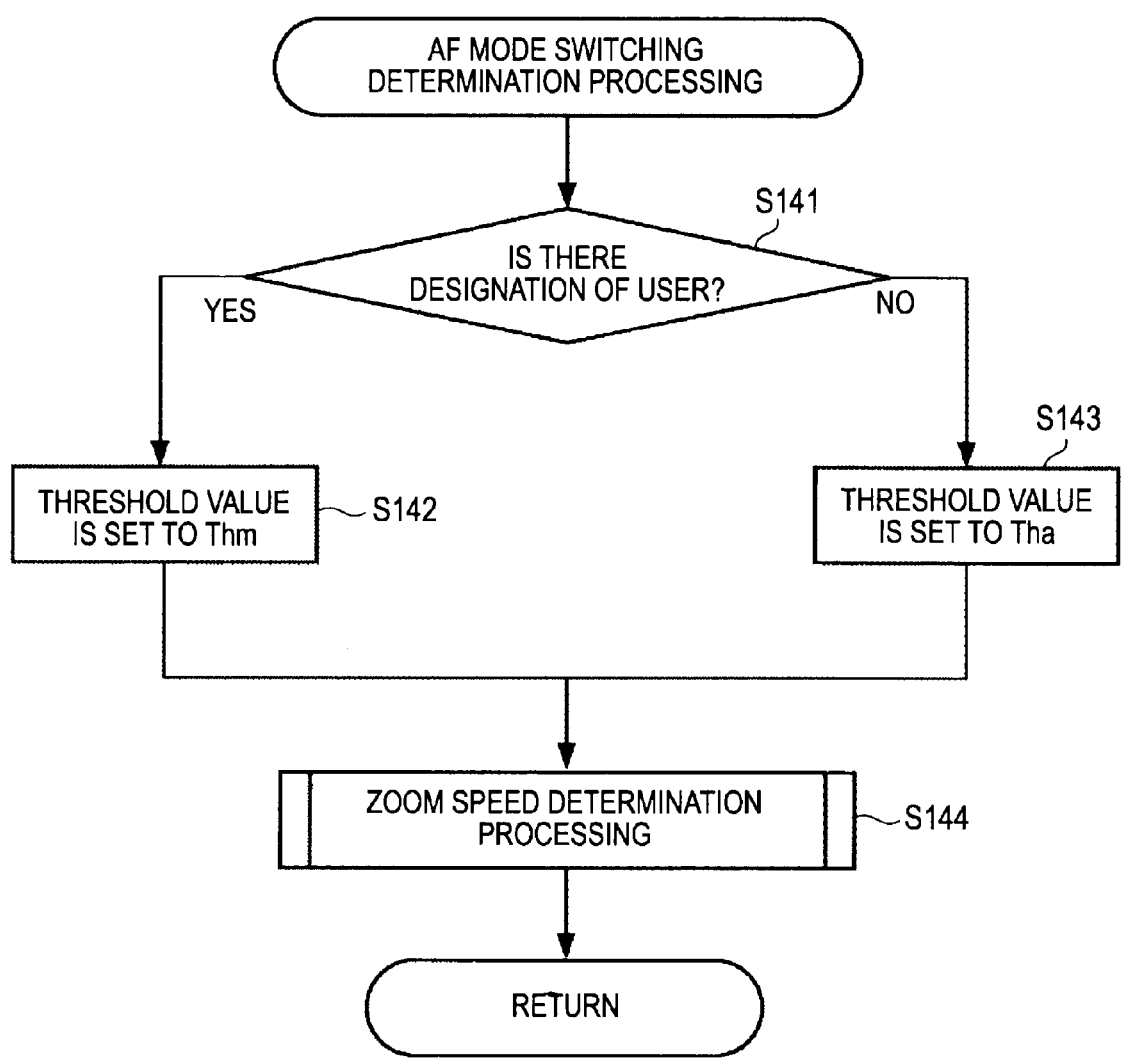
FIG. 16 is a flow chart explaining an example of AF mode switching determination processing corresponding to FIG. 15.

FIG. 16 is a flow chart explaining an example of AF mode switching determination processing when AF mode switching is performed, as described above with reference to FIG. 15. This processing is an example of processing executed as the processing of step S25 in FIG. 4.

In step S141, the control unit 141 determines whether or not there is subject designation by the user. For example, when the image of the face 372 is designated by the icon 374 as shown in the image 371, it is determined that there is subject designation by the user in step S141.

When it is determined that there is subject designation by the user in step S141, the process proceeds to step S142.

In step S142, the threshold value setting section 203 sets a threshold value Thm when there is subject designation by the user.

On the other hand, when it is determined that there is no subject designation by the user in step S141, the process proceeds to step S143.

In step S143, the threshold value setting section 203 sets a threshold value Tha when there is no subject designation by the user.

In addition, the threshold value Tha is set to a lower value than the threshold value Thm. That is, even if the operation is performed at the same zoom speed, it is determined that the zoom speed exceeds the threshold value when there is no subject designation by the user, and it is determined that the zoom speed does not exceed the threshold value when there is subject designation by the user.

In step S144, the control unit 141 executes zoom speed determination processing. Accordingly, it is determined whether or not the zoom speed exceeds the threshold value. In addition, since detailed explanation regarding the zoom speed determination processing of step S144 is the same as for the processing described above with reference to FIG. 6, the explanation will be omitted. In this case, however, the threshold value used for determination in the processing of step S42 is set differently according to whether or not there is subject designation by the user.

Therefore, for example, a user performs a zooming operation at high speed exceeding a threshold value in a state where the image 391 of FIG. 15 is photographed and accordingly, AF mode switching is performed to photograph the image 401. On the other hand, even if the user performs a zooming operation at the same zoom speed as the zooming operation corresponding to the image 401 in a state where the image 371 is photographed, AF mode switching is not performed and the image 381 focused in the subject tracking AF mode is photographed.

The AF mode switching determination processing may also be executed in this way. Thus, it is possible to realize higher operability for a user.

In addition, a threshold value of the zoom speed for determination of AF mode switching may also be set according to the zoom direction, the position of the subject, and the size of the subject in addition to whether or not there is subject designation by the user.

Up to now, the digital camera 100 configured as a digital camcorder has been described as an example. However, the digital camera 100 may also be configured as a digital still camera.

In addition, although the example where the face of the person is a subject detected by the subject detection unit 131 has been described above, it is needless to say that another subject may be detected.

In addition, a series of processing described above may be executed either by hardware or by software. In the case of executing the series of processing described above using software, a program as the software is installed in a computer provided in dedicated hardware from a network or a recording medium. In addition, a program is installed from a network or a recording medium into a general-purpose personal computer 700 which can execute various kinds of functions by installing various kinds of programs and which is shown in FIG. 17, for example.

Figure 17:
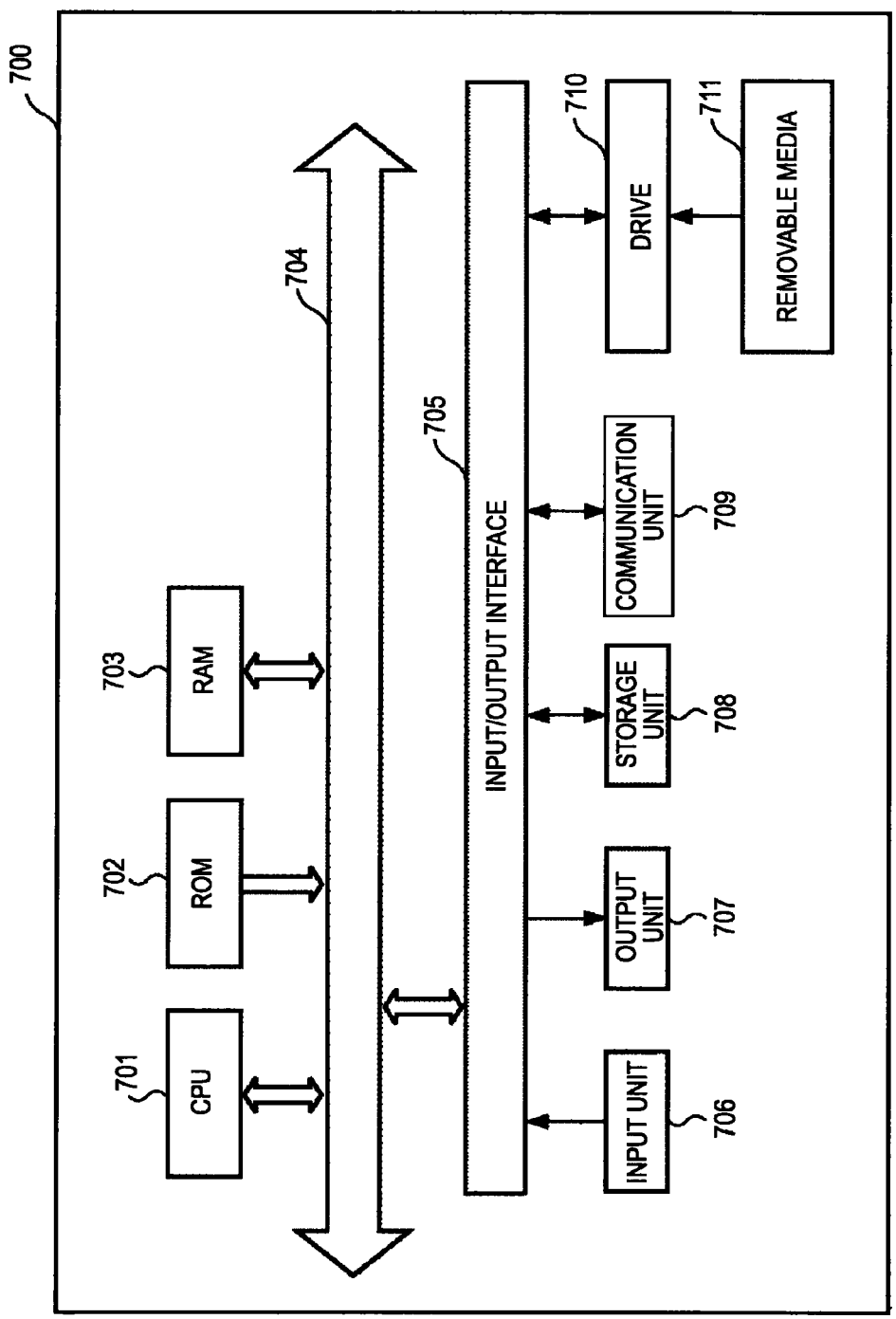
FIG. 17 is a block diagram showing the exemplary configuration of a personal computer.

In FIG. 17, a CPU (Central Processing Unit) 701 executes various kinds of processing according to a program stored in a ROM (Read Only Memory) 702 or a program loaded from a storage unit 708 to a RAM (Random Access Memory) 703. Data and the like required when the CPU 701 executes various kinds of processing are also appropriately stored in the RAM 703.

The CPU 701, the ROM 702, and the RAM 703 are connected to each other through a bus 704. In addition, an input/output interface 705 is also connected to the bus 704.

An input unit 706 formed by a keyboard, a mouse, or the like, a display formed by an LCD (Liquid Crystal Display) or the like, and an output unit 707 formed by a speaker or the like are connected to the input/output interface 705. In addition, the storage unit 708 formed by a hard disk or the like and a communication unit 709 formed by a network interface card, such as a modem or an LAN card, are connected to the input/output interface 705. The communication unit 709 performs communication processing through a network including the Internet.

A drive 710 is additionally connected to the input/output interface 705 when necessary, and removable media 711, such as a magnetic disk, an optical disc, a magneto-optical disc, or a semiconductor memory, is appropriately attached to the input/output interface 705. In addition, computer programs read from these removable media are installed in the storage unit 708 when necessary.

When executing the series of processing described above using software, a program as the software is installed from a network, such as the Internet, or a recording medium, such as the removable media 711.

Moreover, as shown in FIG. 17, this recording medium may be provided, separately from the main body of the apparatus, as recording media such as the removable media 711 including a magnetic disk (including a floppy disk (registered trademark)), an optical disc (including a CD-ROM (Compact Disk-Read Only Memory and a DVD (Digital Versatile Disk)), a magneto-optical disc (including an MD (mini-disk; registered trademark)), and a semiconductor memory which are distributed to supply a program to a user and in which the program is recorded. Alternatively, the recording medium may be provided as, for example, the ROM 702 in which the program is recorded or a hard disk included in the storage unit 708, which is supplied to the user in a state assembled in advance in the main body of the apparatus.

Moreover, the series of processing described above in this specification includes not only processing performed in a time-series manner according to the described order but also processing performed in parallel or separately even if not necessarily performed in a time-series manner.

In addition, embodiments of the present invention are not limited to the above-described embodiments, and various modifications may also be made without departing from the spirit and scope of the present invention.

Reference Signs List

- 100: digital camera
- 101: imaging lens
- 102: imaging device
- 103: analog signal processing unit
- 104: A/D conversion unit
- 105: digital signal processing unit
- 106: liquid crystal panel
- 107: viewfinder
- 108: storage device
- 110: motor driver
- 111: focus lens driving motor
- 112: zoom lens driving motor
- 131: subject detection unit
- 141: control unit
- 142: operating unit
- 143: EEPROM
- 144: ROM
- 145: RAM
- 201: zoom information acquisition section
- 202: subject information acquisition section
- 203: threshold value setting section
- 204: switching determination section

The invention claimed is:

1. An imaging apparatus comprising:

subject detection means for detecting a subject in an image captured by an imaging unit;

subject tracking auto focus (AF) mode execution means for setting a control mode of a lens driving control unit to a subject tracking AF mode, in which a focus follows the detected subject, when the subject is detected in the image;

control means for setting the control mode of the lens driving control unit to a normal AF mode, in which focusing on a middle of the image is performed, on the basis of zooming operation information of a zooming operation through an operating unit in the subject tracking AF mode; and threshold value setting means for setting a threshold value regarding a zoom speed of the zooming operation, wherein the control means sets the control mode of the lens driving control unit to the normal AF mode on the basis of the zoom speed included in the zooming operation information and the threshold value regarding the zoom speed, and wherein the threshold value setting means sets the threshold value according to a zoom direction included in the zooming operation information.

2. The imaging apparatus according to claim 1, wherein the threshold value setting means sets the threshold value according to a position of the subject included in information regarding the subject.

3. The imaging apparatus according to claim 1, wherein the threshold value setting means sets the threshold value according to a position of the subject and a size of the subject included in information regarding the subject.

4. The imaging apparatus according to claim 1, further comprising: subject designation determination means for determining whether or not a subject to be detected by the subject detection means has been designated on the basis of a user's command input through the operating unit, wherein the threshold value setting means sets the threshold value according to whether or not the subject to be detected by the subject detection means has been designated.

5. An imaging method comprising:
when a subject in an image is detected by subject detection means for detecting a subject in an image captured by an imaging unit, setting a control mode of a lens driving control unit to a subject tracking autofocus (AF) mode in which a focus follows the detected subject by a subject tracking AF mode execution means;

setting the control mode of the lens driving control unit to a normal AF mode, in which focusing on a middle of the image is performed, on the basis of zooming operation information of a zooming operation through an operating unit in the subject tracking AF mode by a control means; and setting a threshold value regarding a zoom speed of the zooming operation, wherein the control mode of the lens driving control unit is set to the normal AF mode on the basis of the zoom speed included in the zooming operation information and the threshold value regarding the zoom speed, and wherein the threshold Value is set according to a zoom direction included in the zooming operation information.

* * * * *